United States Patent
Tahk et al.

(10) Patent No.: US 8,914,064 B2
(45) Date of Patent: Dec. 16, 2014

(54) MOBILE TERMINAL AND METHOD OF CONTROLLING THE MOBILE TERMINAL

(71) Applicant: LG Electronics Inc., Seoul (KR)

(72) Inventors: Uisoo Tahk, Gyeonggi-Do (KR); Youngmin Cho, Gyeonggi-do (KR); Seokhwan Oh, Incheon (KR); Donghan Yoon, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/760,828

(22) Filed: Feb. 6, 2013

(65) Prior Publication Data

US 2013/0203462 A1     Aug. 8, 2013

(30) Foreign Application Priority Data

Feb. 7, 2012   (KR) .................. 10-2012-0012518

(51) Int. Cl.
| | |
|---|---|
| H04M 1/00 | (2006.01) |
| G06T 3/60 | (2006.01) |
| H04M 1/02 | (2006.01) |
| G06F 3/0484 | (2013.01) |
| G06F 3/0346 | (2013.01) |
| G06F 1/16 | (2006.01) |
| G06F 3/01 | (2006.01) |
| H04N 7/14 | (2006.01) |

(52) U.S. Cl.
CPC ............... *G06T 3/60* (2013.01); *H04M 1/0266* (2013.01); *H04M 1/0264* (2013.01); *H04M 2250/52* (2013.01); *H04M 1/0241* (2013.01); *G06F 3/04845* (2013.01); *G06F 2200/1614* (2013.01); *H04M 2250/12* (2013.01); *G06F 3/0346* (2013.01); *H04N 2007/145* (2013.01); *G06F 1/1626* (2013.01); *G06F 1/1686* (2013.01); *G06F 1/1694* (2013.01); *G06F 3/017* (2013.01)

USPC ........................................ 455/556.1; 455/566

(58) Field of Classification Search
CPC ..................... H04M 2250/12; H04M 2250/52; H04M 1/0241; H04M 1/72569; G06F 2200/1614
USPC ............................. 455/566, 569.1, 350, 556.1
See application file for complete search history.

(56) References Cited

U.S. PATENT DOCUMENTS

| | | | | |
|---|---|---|---|---|
| 6,148,080 | A | * | 11/2000 | Collin ........................ 379/433.02 |
| 6,295,088 | B1 | * | 9/2001 | Tsukahara et al. ......... 348/333.06 |
| 6,965,413 | B2 | * | 11/2005 | Wada ............................. 348/376 |

(Continued)

FOREIGN PATENT DOCUMENTS

| | | |
|---|---|---|
| CN | 1534589 A | 10/2004 |
| CN | 102203850 A | 9/2011 |
| WO | WO 2008/085741 A2 | 7/2008 |
| WO | WO 2010/030985 A1 | 3/2010 |

*Primary Examiner* — Duc M Nguyen
(74) *Attorney, Agent, or Firm* — Birch, Stewart, Kolasch & Birch, LLP

(57) ABSTRACT

A mobile terminal including a main body; a display unit arranged on a front side of the main body, and configured to display a video communication screen in a first direction when a video communication event occurs; a camera arranged in a lower end portion of the front side and configured to capture an image during the video communication event; a sensing unit installed in the main body, and configured to detect a motion of the main body in response to the video communication event; and a controller configured to switch a displaying direction of the video communication screen from the first direction to a second direction based on the detected motion of the main body.

13 Claims, 19 Drawing Sheets

(56) References Cited

U.S. PATENT DOCUMENTS

| | | | |
|---|---|---|---|
| 7,174,195 B2* | 2/2007 | Nagamine | 455/575.1 |
| 8,676,250 B2* | 3/2014 | Tanabe | 455/550.1 |
| 2002/0028693 A1* | 3/2002 | Johnson | 455/550 |
| 2003/0112358 A1* | 6/2003 | Hamada | 348/333.12 |
| 2004/0157647 A1* | 8/2004 | Takahashi | 455/566 |
| 2004/0179330 A1* | 9/2004 | Lee et al. | 361/679 |
| 2005/0020317 A1* | 1/2005 | Koyama | 455/566 |
| 2005/0143124 A1* | 6/2005 | Kennedy et al. | 455/556.1 |
| 2008/0102901 A1* | 5/2008 | Kimura | 455/566 |
| 2008/0165144 A1* | 7/2008 | Forstall et al. | 345/173 |
| 2010/0029255 A1 | 2/2010 | Kim et al. | |
| 2010/0077341 A1 | 3/2010 | Chen | |

* cited by examiner

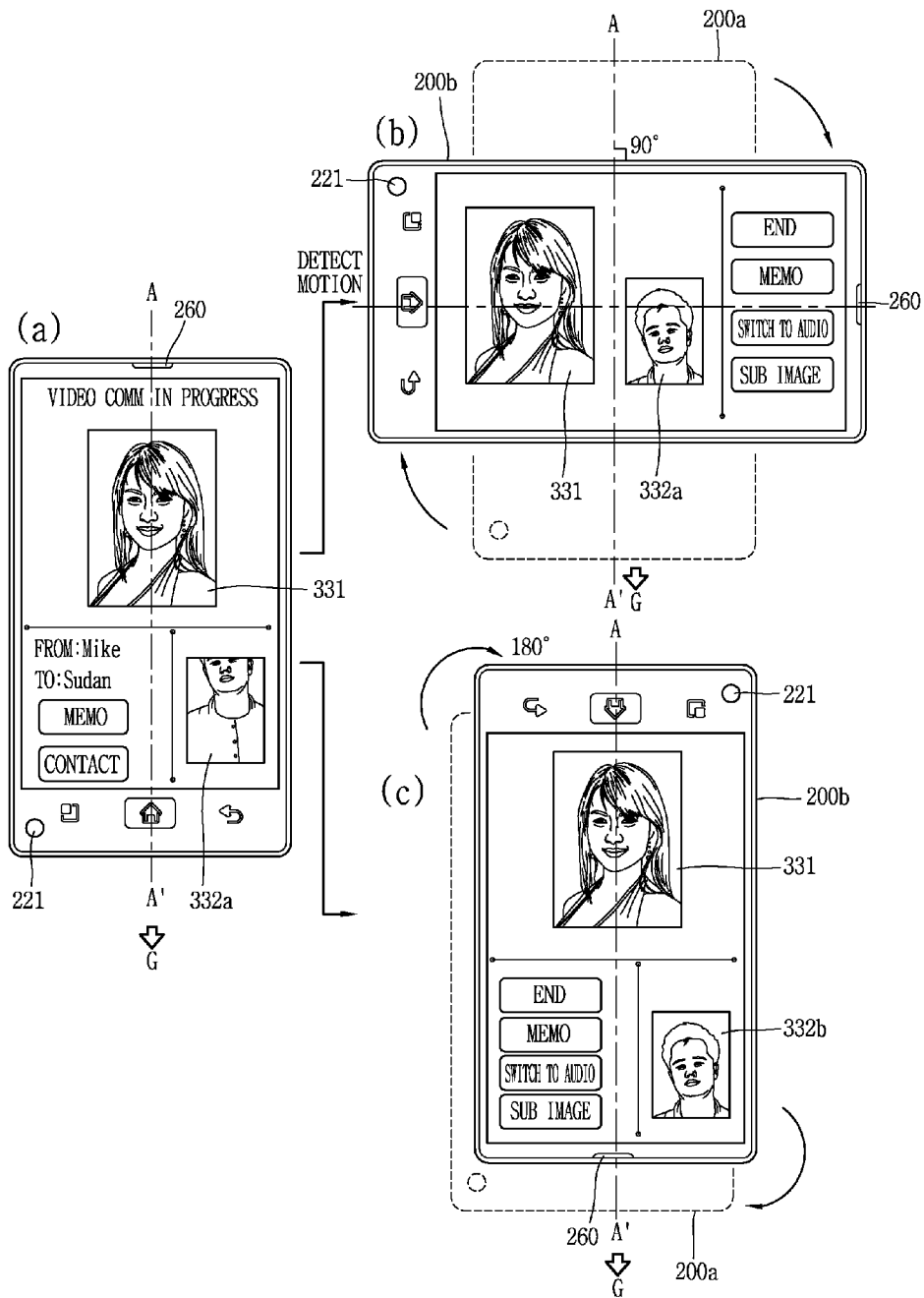

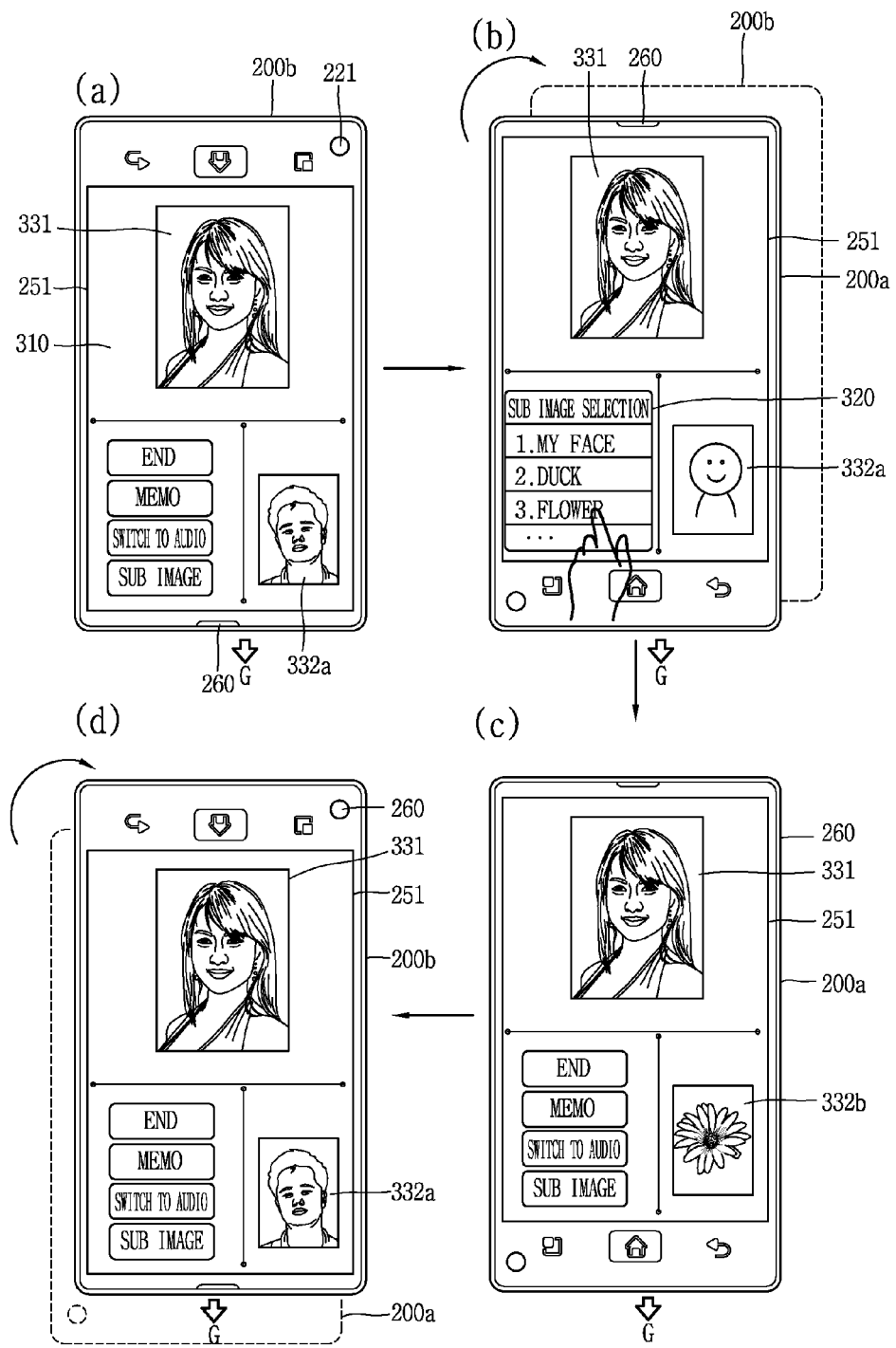

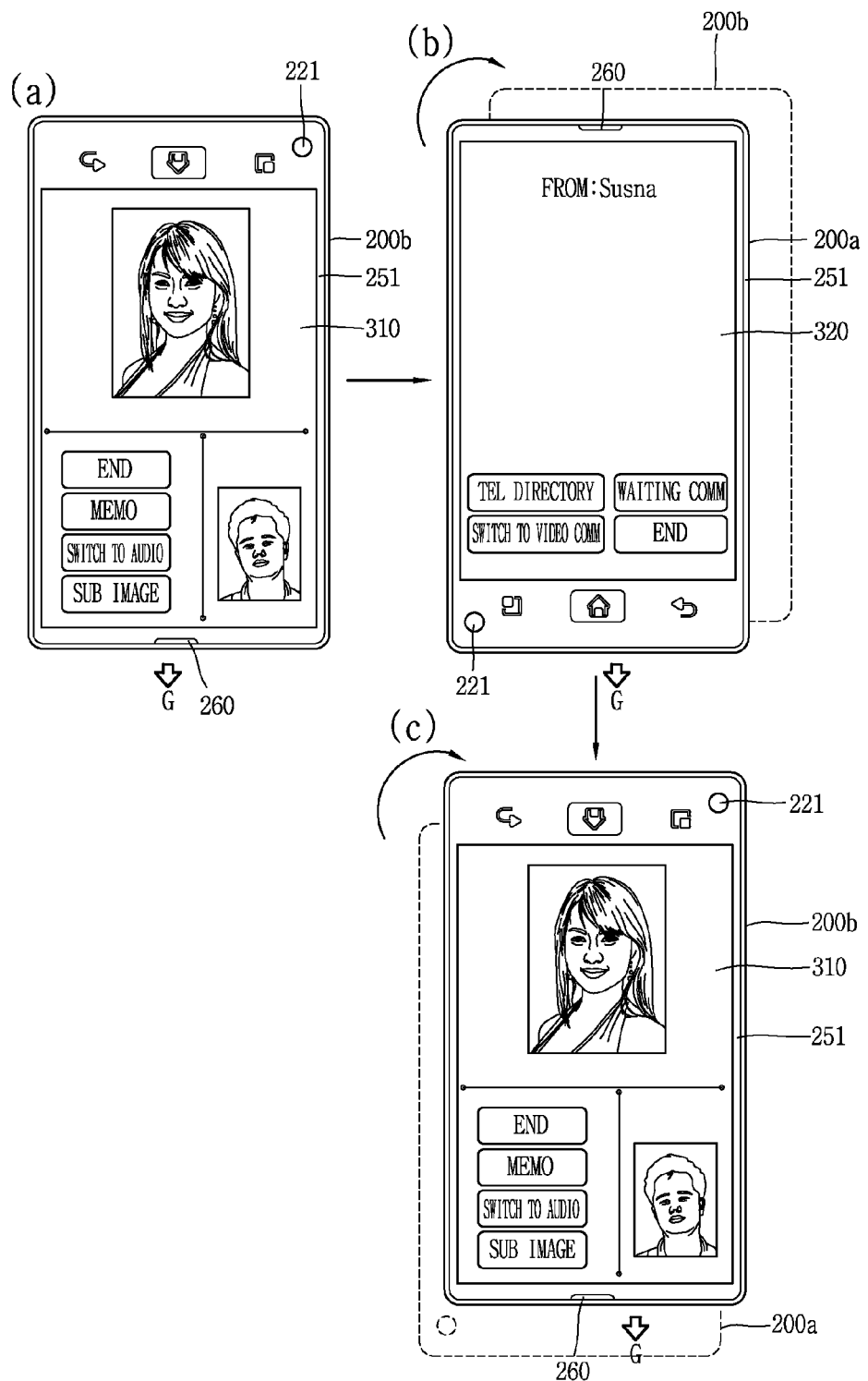

MOBILE TERMINAL AND METHOD OF CONTROLLING THE MOBILE TERMINAL

CROSS-REFERENCE TO RELATED APPLICATION

Pursuant to 35 U.S.C. §119(a), this application claims the benefit of earlier filing date and right of priority to Korean Application No. 10-2012-0012518, filed on Feb. 7, 2012, the contents of which is incorporated by reference herein in its entirety.

BACKGROUND OF THE INVENTION

1. Field of the Invention

The present invention relates to a mobile terminal providing a function of video communication and a method of controlling the mobile terminal.

2. Background of the Invention

A terminal is broadly categorized by mobility into a mobile terminal and a stationary terminal. The mobile terminal is further categorized by portability into a handheld terminal and a vehicle-mounted terminal.

The mobile terminal also functions as a multimedia player with multiple functions such as photographing, shooting a moving picture, reproducing digital audio and video compression files, playing a game, receiving a broadcast or the like.

The mobile terminal is also designed with the user's convenience in mind. As a result, in recent years, the mobile terminal has been configured to include a large-sized display unit and has been designed to reduce unnecessary space. However, the arrangement of an electronic element such as a front-side camera on the front side of the mobile terminal imposes a limitation on the size of the display unit. Accordingly, structural modifications to the electronic element and the liquid crystal are considered to enlarge the display unit beyond the limitation.

There occurs a problem in that image data on the user's face is not completely obtained during video communication because, for example, when a position of a camera is changed, a viewing angle of the camera is changed.

SUMMARY OF THE INVENTION

Therefore, an aspect of the detailed description is to provide a mobile terminal displaying a large-sized screen.

Another object of the present invention is to provide a mobile terminal that has a larger-sized display unit maintaining functions that has to be performed through the front side and a method of controlling the mobile terminal.

A further object of the present invention is to provide a video communication function in which a change in a viewing angle resulting from a change in a position of a camera is compensated for.

To achieve these and other advantages and in accordance with the purpose of this specification, as embodied and broadly described herein, there is provided a mobile terminal including a main body, a display unit that is arranged on a front side of the main body, and that is configured to display a screen associated with video communication when a video communication event occurs, a sensing unit that is installed in the main body, and that is configured to detect motion of the main body in response to the video communication event, and a controller that controls the display unit in such a manner that a displaying direction of the screen is switched based on a result of the detection by the sensing unit when the motion of the main body meets a reference condition.

In the mobile terminal, the motion of the main body may be rotation of the main body with respect to a predetermined imaginary reference axis, and the controller may compute an angle between the main body and the reference axis when the sensing unit detects the motion of the main body.

In the mobile terminal, when the computed angle is 90 degrees or 180 degrees, the displaying direction of the screen may be switched, and the image may be rotated by 90 degrees or by 180 degrees with respect to the reference axis to correspond to the computed angle.

In the mobile terminal, the controller may output alert information, which indicates a request for motion of the main body in response to the video communication event.

In the mobile terminal, the alert information may be output as at least one of a sound, a vibration, and a pop-up window.

In the mobile terminal, the controller may control the sensing unit in such a manner that the motion of the main body is detected after the alert information is output.

In the mobile terminal, the controller may control the display unit in such a manner that the displaying direction of the screen is switched back, when the video communication that is set up in response to the video communication event is terminated.

In the mobile terminal, the motion of the main body that meets the reference condition may be motion of the main body from a first position that corresponds to the predetermined imaginary reference axis to a second position that is inclined at a predetermined angle with respect to the first position.

The mobile terminal may further include a camera that is arranged on the front side of the main body, and that is activated based on an occurrence of the video communication event and instead of image data, the controller may transmit a substitute image, input through the camera, to the other party's electronic device that is in connection for the video communication, when the main body is moved from the second position to the first position in a state where the displaying direction of the screen is switched.

In the mobile terminal, the controller may display a substitute image list on the display unit when the main body is moved from the second position to the first position, and transmit an image that corresponds to an image item selected by a user from the substitute image list, as the substitute image.

In the mobile terminal, instead of the substitute image, the image data that is input through the camera may be transmitted when the main body is switched from the first position back to the second position in a state where the substitute image is transmitted.

In the mobile terminal, the controller may switch the video communication to audio communication when the main body is moved from the second position to the first position in the state where the displaying direction of the screen is switched.

In the mobile terminal, the video communication event may be any one of a video communication receiving event and a video communication transmitting event, and the controller may operate in a video communication mode based on a communication connection control command input by a user when the motion of the main body is moved to meet a reference condition based on an occurrence of the video communication receiving event, and may operate in an audio communication mode based on the communication connection control command when the motion of the main body does not meet the reference condition.

In the mobile terminal, a pop-up window from which to select the audio communication mode or the video communication mode may be displayed on the display unit in response to an occurrence of the video communication receiving event, and the controller may control the sensing unit in such a manner that the motion of the main body is detected based on the selection by a user of the video communication mode.

According to another aspect of the present invention, there is provided a mobile terminal including a main body, a camera that is arranged on a front side of the main body and that is activated base on an occurrence of a video communication event, a display unit that is arranged in the main body and that is configured to display a video communication screen including image data, input through the camera and a controller that controls the display unit in such a manner that a displaying direction of the video communication screen is switched to change a viewing angle of the camera.

In the mobile terminal, a sound output unit, configured to output a sound associated with the video communication, may be arranged in the main body, and the camera may be arranged in the other end portion, which is opposite to the one end portion in which the sound output unit is arranged, with the display unit in between.

In the main body of the mobile terminal, a sensing unit may be provided which is configured to detect motion of the main body in response to the video communication event, and the controller may control the display unit in such a manner that the displaying direction of the screen is switched when the motion of the main body meets a reference condition.

In the mobile terminal, the controller may display a pop-up window, which indicates a request for the motion of the main body, on the display unit.

In the mobile terminal, icons from which a user choose to determine whether to switch to the video communication screen may be displayed in the pop-up window, and the controller may control the display unit in such a manner that the displaying direction of the screen is switched based on the selection of the corresponding icon.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 10A and 10B are conceptional views for describing the displaying direction of the screen that depends on motion of a main body of the mobile terminal in the mobile terminal according to one embodiment of the present invention;

FIGS. 11A, 11B, and 11C are conceptional views for describing a method of switching between a video communication mode or an audio communication mode based on the position of the main body of the mobile terminal in the mobile terminal according to one embodiment of the present invention.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated. The suffixes "module" and "unit or portion" for components used in the following description merely provided only for facilitation of preparing this specification, and thus they are not granted a specific meaning or function. If it is regarded that detailed descriptions of the related art are not within the range of the present invention, the detailed descriptions will be omitted. Furthermore, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC and an ultra book. However, it will be obvious to those skilled in the art that the present invention may be also applicable to a fixed terminal such as a digital TV and a desktop computer, except for specific configurations for mobility.

Figure 1:
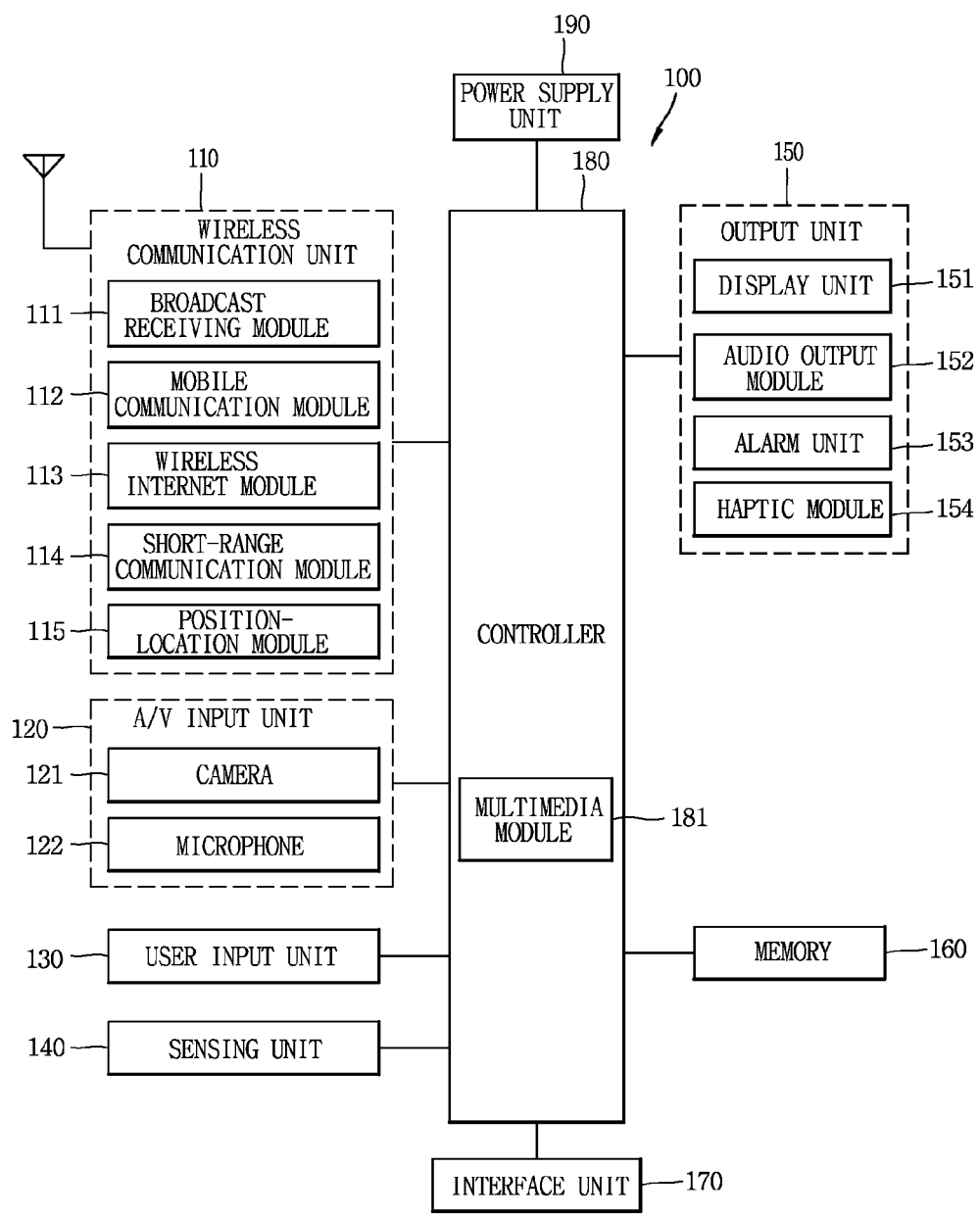
FIG. 1 is a block diagram illustrating a mobile terminal according to one embodiment of the present invention.

FIG. 1 is a block diagram of a mobile terminal according to an embodiment of the present invention.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views another party, whereas the voice call mode indicates a call performed while a user does not view another party. For implementation of the video call mode and the voice call mode, the mobile communication module 112 is configured to transceive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for acquiring a location (or position) of the mobile communication terminal. For example, the location information module 115 may include a GPS (Global Positioning System) module.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or a capturing mode, the display unit 151 may display a captured and/or received image or a GUI or a UI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The rear surface portion of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. Such video signal or audio signal may be output through the display unit 151 or the audio output module 152. Accordingly, the display unit 151 or the audio output module 152 may be categorized into part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are inputted or outputted. The memory 160 may store therein data on vibrations and sounds of various patterns output when a touch is input onto the touch screen.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Once a preset condition of the mobile terminal is satisfied, the controlled 180 can execute a locked state for limiting a user's input of control commands with respect to applications. And, the controller 180 can control a locked screen displayed in the locked state, based on a touch input sensed by the display unit (hereinafter, will be referred to as 'touch screen' 151) in the locked state.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Figure 2A:
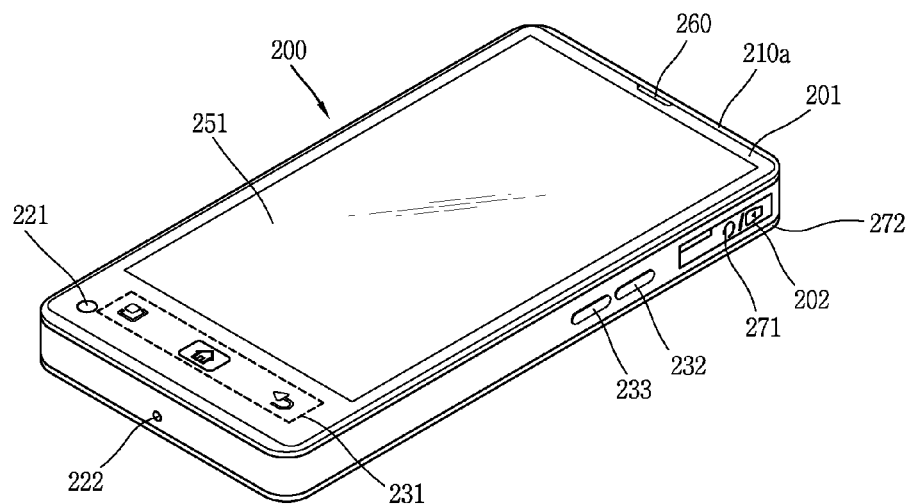
FIGS. 2A and 2B are perspective views illustrating a mobile terminal according to one embodiment of the present invention when viewed from the front side.
Figure 2B:
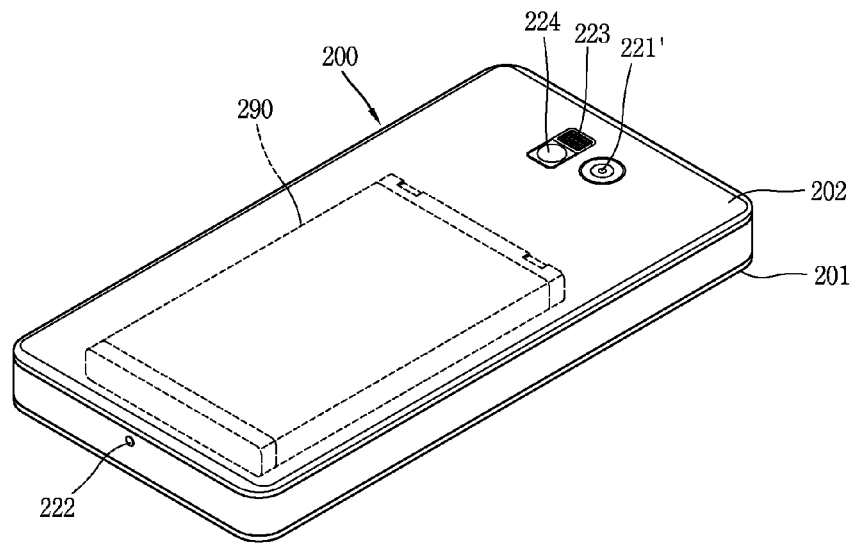

Next, FIG. 2A is a perspective view illustrating one example of the mobile terminal according to the present invention when viewed from the front side. FIG. 2B is a perspective view of the mobile terminal illustrated in FIG. 2A, when viewed from the back side.

A mobile terminal 200 shown in FIGS. 2A and 2B includes a bar-shaped body. However, the present invention is not limited to this configuration, and may have various configurations such as a slide type that two or more bodies are combined in such a manner as to make a relative movement with respect to each other, a folder type, a swing type, a swivel type and the like.

The body includes a case (including a casing, a housing, a cover and the likes) making up an exterior appearance. According to the present embodiment, the case is divided into a front case 201 and a rear case 202. Various electronic components are installed between the front case 201 and the rear case 202. At least one middle case may be additionally installed between the front case 201 and the rear case 202.

The cases may be formed from synthetic resin through the use of injection molding, and may be formed from metal such as stainless steel (STS) or Ti. A display unit 251, a sound output unit 260, a camera 221, user input units 231, 232, and 233 and the like may be provided in the body, particularly in the front case 201.

The display unit 251 takes up most of the main surface of the front case 201. The sound output unit 260 is arranged in one end portion of the display unit 251, and the camera 221 is arranged in the other end portion, which is opposite to the one end portion in which the sound output unit 260 is arranged.

That is, the sound output unit 260 and the camera 221 are arranged in the opposite end portions, respectively, with the display unit 251 in between. In this manner, the display unit 151 is closer to the one end portion 210a of the front case 201 than to the other end portion, by arranging the sound output unit 260 and the camera 221 in the different end portions of the front case 201, respectively.

On the other hand, various items of visual information are displayed on the display unit 251. The various items of visual information are displayed in the form of a letter, a number, a symbol, a graph, an icon or the like.

At least at least one of the letters, the numbers, the symbols, the graphics, the icons or the like may be displayed, making a uniform arrangement in the form of a keypad from which to input the items of information. The keypad is also known as "soft keys."

The display unit 251 operates to display an entire screen, or a section-divided screen. In the latter case, the multiple sections are configured to be displayed in such a manner as to be associated with each other. A user input unit 230 is operated to receive a command input to control operation of the mobile terminal 200, and may include multiple operational sub-units 231, 232, and 233. The operational sub-units 231, 232, and 233 are also collectively called a set of operational sub-units. Whatever gives a user a sense of touch during its operation may be adopted as the operational sub-unit.

The content that is input through the use of the first to third operational sub-units 231, 232 and 233 are set to be various. For example, the first operational sub-unit 231 receives command inputs such as START, END, and SCROLL, and is arranged in the end portion different from the end portion in which the sound output unit 260 is arranged. The second and third operational sub-units 232 and 233 are set to receive command inputs such as to adjust the volume of sound that is output from the sound output unit 260, or to switch to a mode in which to recognize a touch on the display unit 251.

Referring to the drawings, a wire/wireless headset port 271 and a wire/wireless data port 272 are arranged on one lateral side of the mobile terminal. The ports 271 and 272 are configured as one example of the interface 170 (refer to FIG. 1).

Referring to FIG. 2B, a camera 221' may be additionally installed on the back side of the body, that is, in the rear case 202. The camera 221' may be substantially opposite in photographing direction to the camera 221 (refer to FIG. 2A) and may have the different number of pixels than the camera 221.

For example, the camera 221 may have the small number of pixels to such an extent that an image of the user's face is enabled to be captured for transmission to the other party at the other end, for example, during video communication, and the camera 221' may have the high number of pixels because an image of a usual object is frequently captured using it and the captured image does not need to be transmitted immediately most of the time. The cameras 221 and 221' may be installed on the body in such a manner as to be rotatable with respect to the body or to pop out of the body.

A flash 223 and a mirror 224 may be additionally arranged adjacent to the camera 221'. The flash 223 illuminates the object when the camera 221' is used to photograph the object. Through the mirror 224, the user may adjust his/her posture for photographing when using the camera 221' to photograph himself/herself (self-photographing).

A sound output unit may be additionally arranged on the back side of the body. The sound output unit may work together with the sound output unit 260 (refer to FIG. 2A) to perform a function of producing stereo sound, and may operate in a speakerphone mode during a telephone call.

In addition to an antenna for a telephone call, an antenna for receiving a broadcast signal may be installed on a lateral side of the body. An antenna, making up the broadcast receiving module 111 (refer to FIG. 1), may be installed in such a manner as to be possibly pulled out of and be pushed into the body.

A mike 222, an interface 270, and others may be installed in the body. The mike 222 is arranged in the different end portion from the one end portion in which the sound output unit 260 is arranged. A user input unit 232, a connection port, and others may be arranged on lateral sides of the front case 201 and the rear case 202.

Through the connection port, data are received from an external device, power is supplied for each constituent element in the mobile terminal 200, or data is transmitted from the mobile terminal 200 to the external device. A connection port may be configured as one example of the interface unit 170 (refer to FIG. 1). A power supply unit 290, configured to supply power for the mobile terminal 200, is installed in the body. The power supply unit 290 may be configured to be built into the body, or to be detachably attached directly to the body from the outside.

Referring back to FIG. 2A, the display unit 251 is configured to be large-sized. That is, the display unit 251 takes up most of the front side of the body. For this reason, a bezel that comes out to the front side is narrowly formed, and the arrangement of the sound output unit 260 and the camera 221 on the different end portions makes the sound output unit 260 and the display unit 251 very close to each other. A mechanism by which to realize the above-disclosed structural characteristics of the mobile terminal according to the present invention is described below.

Figure 3A:
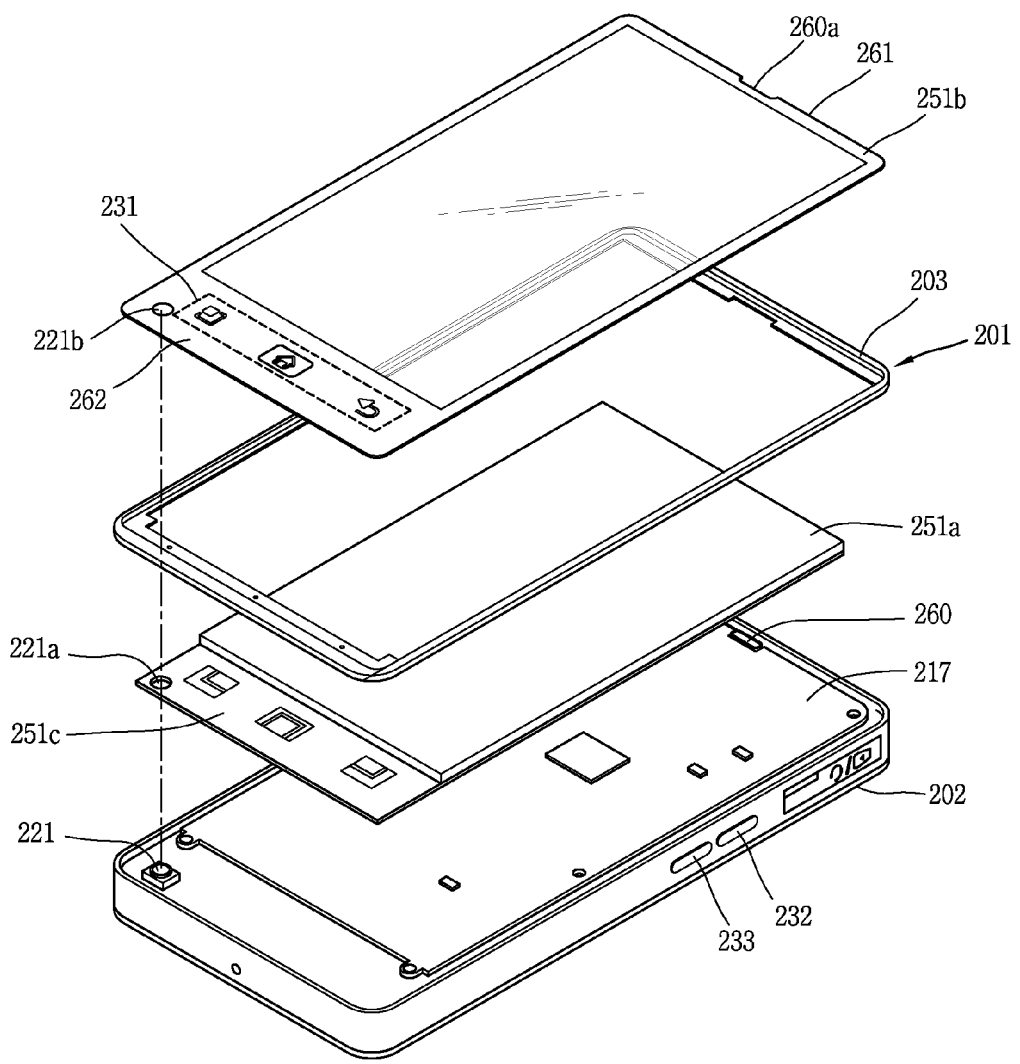
FIGS. 3A and 3B are exploded views illustrating the mobile terminal in FIG. 2A when viewed from the front side.

FIG. 3 is an exploded view illustrating the mobile terminal in FIG. 2A when viewed from the front side. Referring to FIG. 3, a window 251b is combined with one side of the front case 201. A touch sensor may be installed in the window 251b. The touch sensor is configured to detect a touch input, and to have optical transparency. The touch sensor is mounted on the front side of the window 251b, and is configured to convert for example, a change in a voltage occurring in a specific region of the window 251b to an electric input signal.

As illustrated in the drawings, the window 251b is mounted on a bezel 203 of the front case 201. Otherwise, the bezel 203 may be provided separately from the front case 201. The window 251b is made of transparent material such as transparent synthetic resin or strengthened glass. Incidentally, the window 251b may include a non-transparent region. The non-transparent region may be realized by separately covering the window 251b with a pattern film. The pattern film may be configured to be transparent in the center, and to be non-transparent around the edge.

At least one part of the non-transparent region of the pattern film covers the bezel 203 and the transparent region (the region through which light passes) covers a display unit 251a. This enables the user to recognize the visual information displayed on the display unit 251a when he views the display unit 251a. According to an embodiment of the present invention, an adjustment in a position of components to be mounted on the bezel 203 narrows the width of the bezel 203 to a minimum.

As illustrated in the drawing, the display unit 251a is mounted on the back side of the window 251b and a circuit board 217 is mounted on the rear case 202. The circuit board 217 may be configured as one example of the controller 180 (refer to FIG. 1) configured to perform various functions of the mobile terminal.

On the other hand, in order to minimize the non-transparent region of the window 251b, the sound output unit 260 is arranged in a region that corresponds to a first end portion 261 and the camera 221 is arranged in a region that corresponds to a second end portion 262 that is positioned in the opposite direction of a first end portion 261.

Figure 3B:
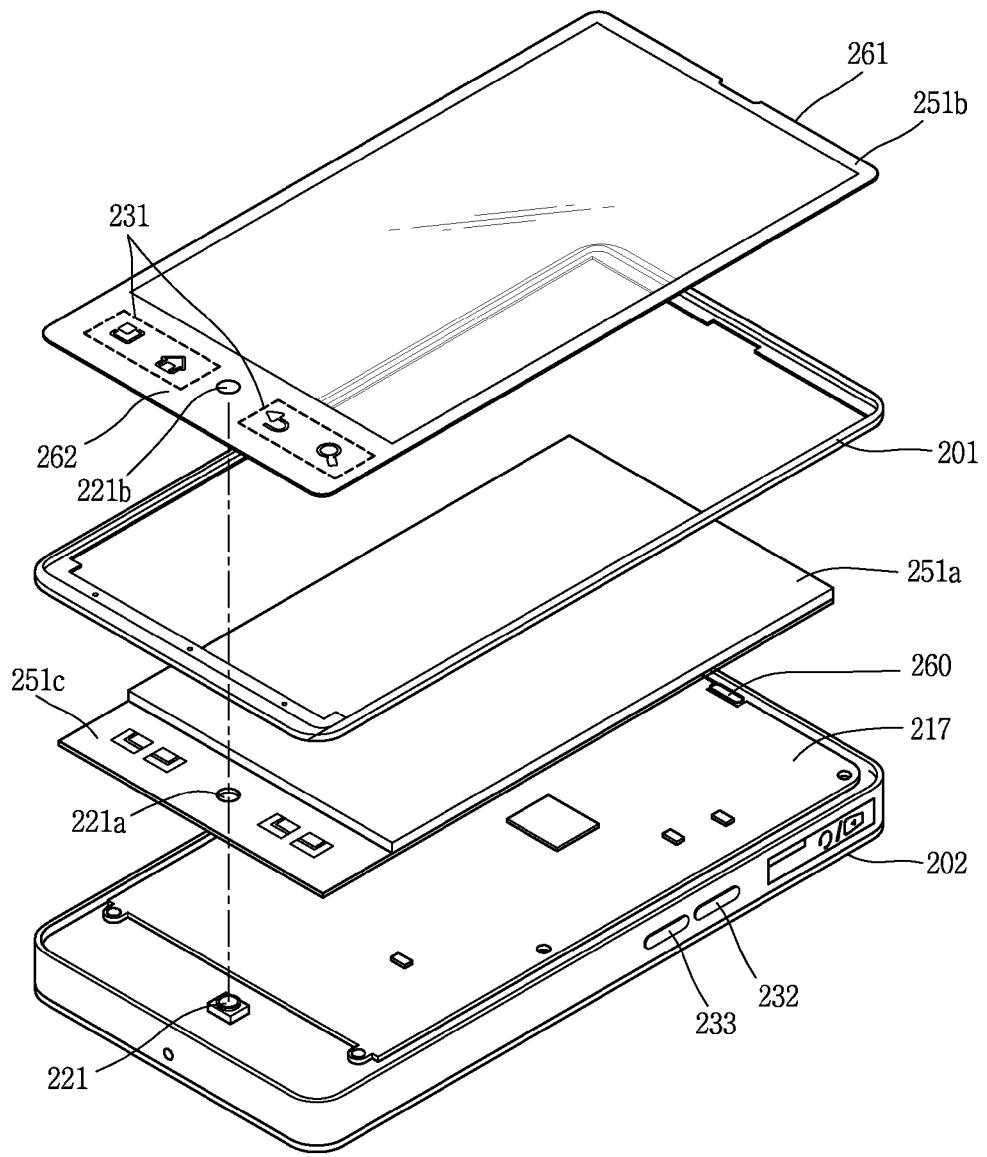

The camera 221 is arranged on one lateral side of the second end portion 262, or is arranged in the center of the second end portion 262 as illustrated in FIG. 3B. When the camera 221 is arranged in such a manner as to correspond to the center of the second end portion 261, an object may be photographed with the camera 221, focusing on the center of the object, during the video communication.

In this manner, the camera 221 is connected to the circuit board 217 in such a manner that the object is photographed from the front side of the mobile terminal, and camera holes 221a and 221b are formed in at least one of the window 251b, an illumination unit 251c, and the bezel 203.

On the other hand, according to an embodiment of the present embodiment, a thin film transistor-liquid crystal display (TFT LCD) is disclosed as an example of the display unit 251a, but the present invention is not limited to the thin film transistor-liquid crystal display. For example, the display unit 251a may include a liquid crystal display (LCD), an organic light-emitting diode (OLED), a flexible display, a 3D display and more.

As described above, the displaying direction of the screen associated with the video communication is switched during the video communication, in the mobile terminal in which the sound output unit 260 and the camera 221 are arranged in the opposite end portions, respectively, with the display unit 251 in between. That is, when a distance between the upper end portion of the mobile terminal 200, that is the bezel 203, and the display unit 251 is decreased to increase the size of the display unit 251 or to make the mobile terminal aesthetical in appearance, the camera 221 may be arranged to be positioned on the lower end portion of the mobile (e.g., in the present specification, one end portion of a main body 200 of the mobile terminal, where the sound output unit 260 is arranged, is defined as the 'upper end portion', and the other end portion of the main body 200 of the mobile terminal, where the camera 221 is arranged, is defined as the 'lower end portion,' with the display unit 151 in between.).

Figure 4A:
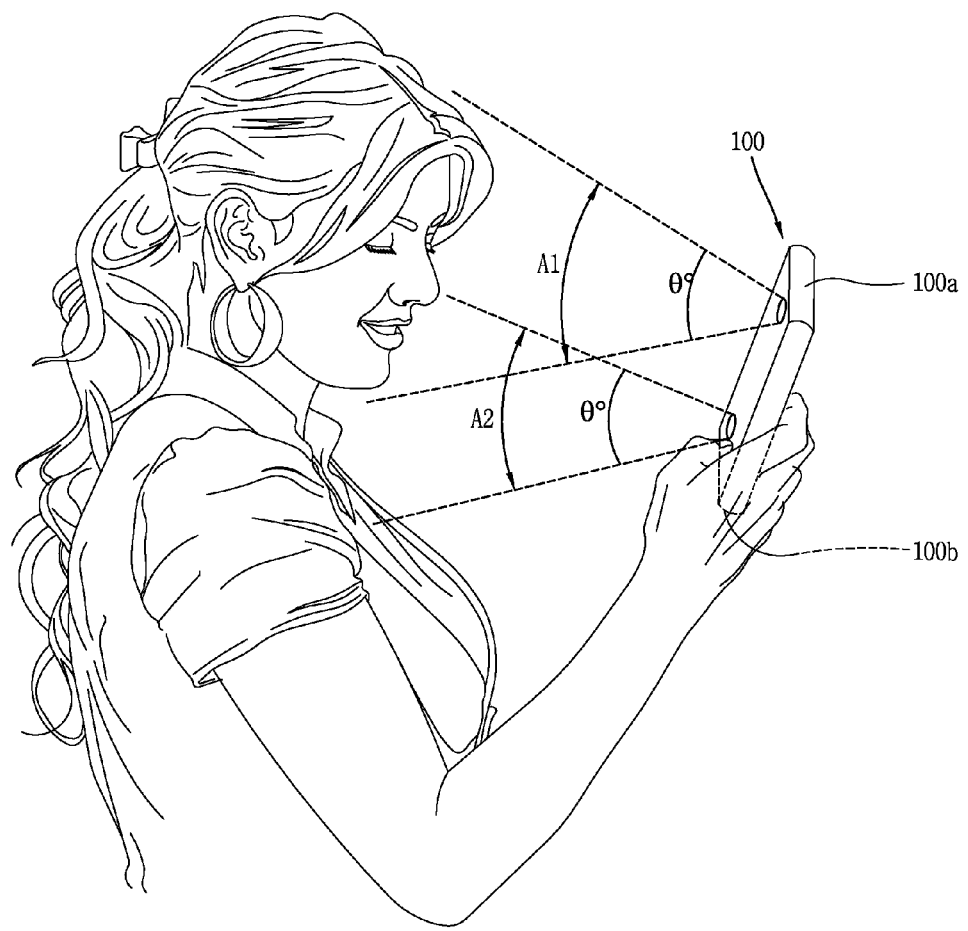
FIGS. 4A and 4B are conceptional views for describing a method of performing video communication in the mobile terminal according to one embodiment of the present invention.

In addition, referring to FIG. 4A, the user generally uses the mobile terminal in which the one end portion with the sound output unit 260 is turned upward. Because the user uses the mobile terminal in such a manner that the one end portion in which the sound output unit 260 is arranged corresponds to the direction in which the user views the image, the user has to move the mobile terminal 200 upward when he or she photographs his/her face using the camera 221 arranged in the lower end portion. This is because a viewing field A1 or A2 (refer to FIG. 4A) that refers to how wide or how close the object appears relative to the camera 221, that is, refers to a viewing angle, is limited and thus the user's face is not photographed in its entirety within the viewing field A2 when the camera 221 is arranged in the lower end portion.

Therefore, when the camera 221 is arranged in the lower end portion of the main body 200, a problems occurs when using the camera 221 during the video communication in that the user's face is photographed partly, not in its entirety, due to the position of the camera 221. Furthermore, when the user moves the mobile terminal 200 upward to photograph his/her face in its entirety in order to prevent this, the display unit 251 is positioned more upward than the direction in which the user views the image and as a result, the user can not view an image of the other party at the other end, displayed on the display unit 251.

Accordingly, the one end portion in which the camera 221 is arranged is made to correspond to the direction in which the user views the image in order to photograph the user's face in its entirety using the camera 221 arranged in the lower end portion of the mobile terminal 200. Thus, the main body 200 is rotated by 180 degrees or 90 degrees, in such a manner that the one end portion in which the camera 221 is arranged is rotated upside down to be the upper end portion of the main body 200.

However, when the main body 200 is rotated in this manner, the user has difficulty viewing the image during the video communication because the displaying direction of the screen displayed on the display unit 151 does not correspond to the direction in which the user views the image.

Accordingly, in the mobile terminal according to an embodiment of the present invention, a user interface is provided which switches the displaying direction of the screen to change (or correct, revise) the viewing angle of the camera 221 during the video communication. A method of switching the displaying direction of the video communication screen displayed on the display unit 251 when a video communication event occurs is described in detail below referring to the accompanying drawings.

Figure 4B:
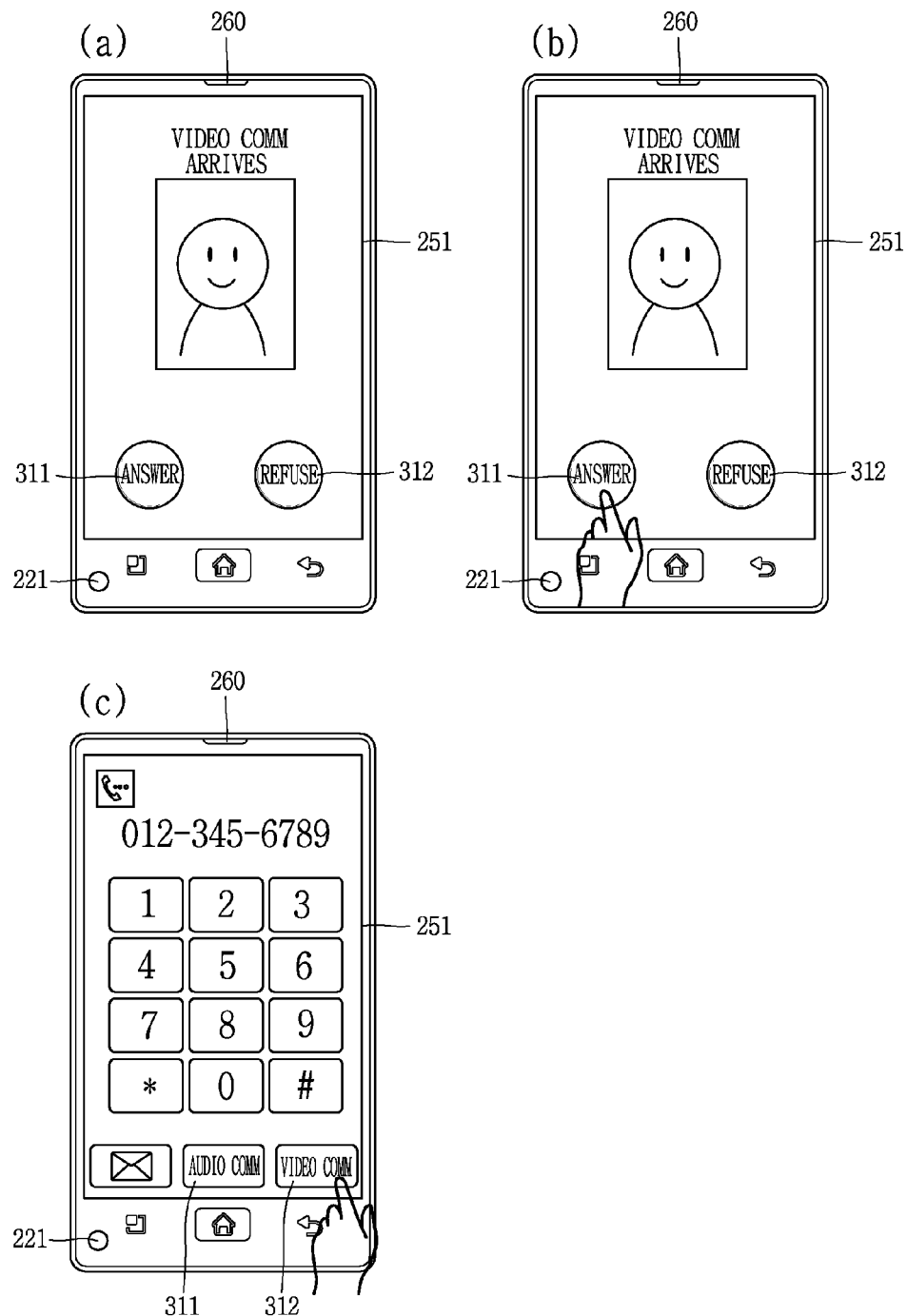

FIGS. 4A and 4B are conceptional views for describing a method of setting up the video communication in the mobile terminal according to one embodiment of the present invention. As described above, when the camera is positioned (or arranged) at the lower end portion 100b (refer to FIG. 4A), there occurs a problem in that only an image of one part of the user's face is transmitted to the other party at the other end because the viewing field of the camera is limited.

Accordingly, in the mobile terminal according to an embodiment of the present invention, when the video communication event occurs, the entire object (for example, the user's entire face) may be normally photographed without excluding one part of the object, by moving the one end portion in which the camera is arranged, in such a manner that the one end portion is positioned in the direction of the upper end portion 100a (refer to FIG. 4A).

In addition, in the mobile terminal according to an embodiment of the present invention, the occurrence of the "video communication event" is defined as meaning that a call is received which corresponds to the video communication, as illustrated on the upper left side (a) of FIG. 4B, or that the user inputs a video communication connection/control command after receiving the call corresponding to the video communication, as illustrated on the upper right side (b) of FIG. 4B, or that the call corresponding to the video communication is transmitted, for example, by the user's selection, as illustrated on the lower left side (c) of FIG. 4B. That is, the video communication event referred to according to the present invention is either a video communication receiving event, or a video communication transmitting event, and the video communication receiving event includes an event in which a call is received and an input of a control command for setting up the telephone call corresponding to the received call.

A method of switching the displaying direction of the screen to correspond to the video communication event is described below referring to the accompanying drawings.

Figure 5:
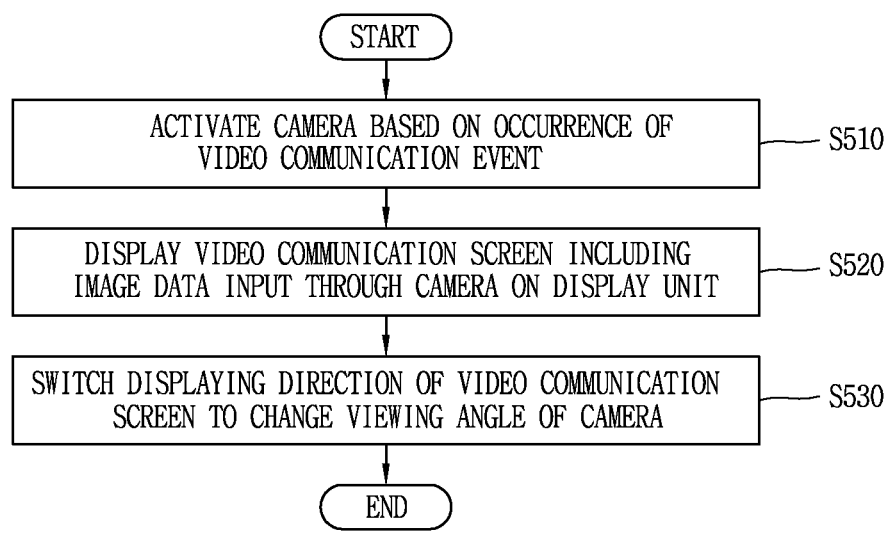
FIG. 5 is a flow chart illustrating a method of switching displaying direction of a screen during the video communication in the mobile terminal according to one embodiment of the present invention.
Figure 6A:
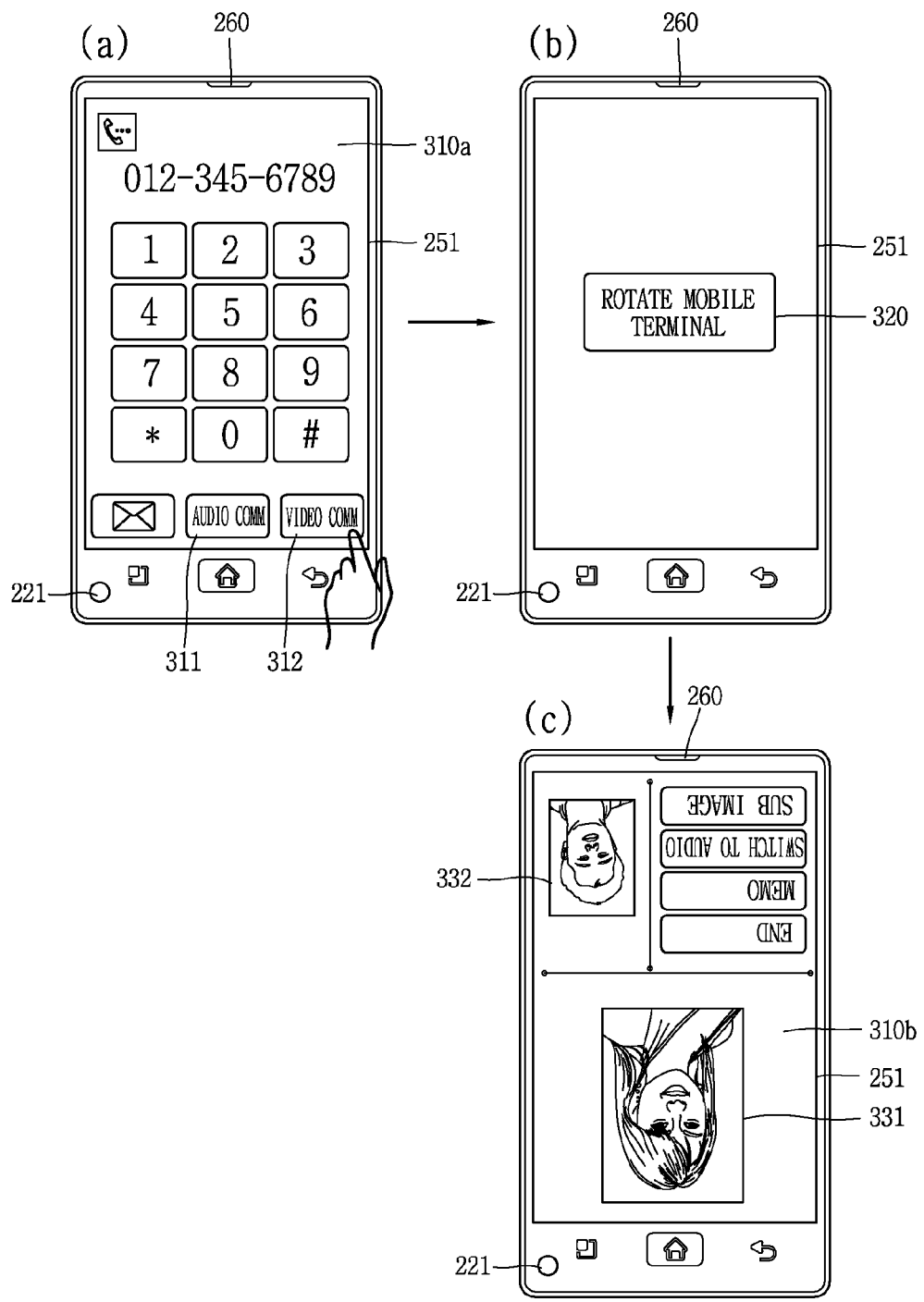
FIGS. 6A and 6B are conceptional views for describing a method of performing the video communication, as illustrated in FIG. 5, in the mobile terminal according to one embodiment disclosed in the present description.
Figure 6B:
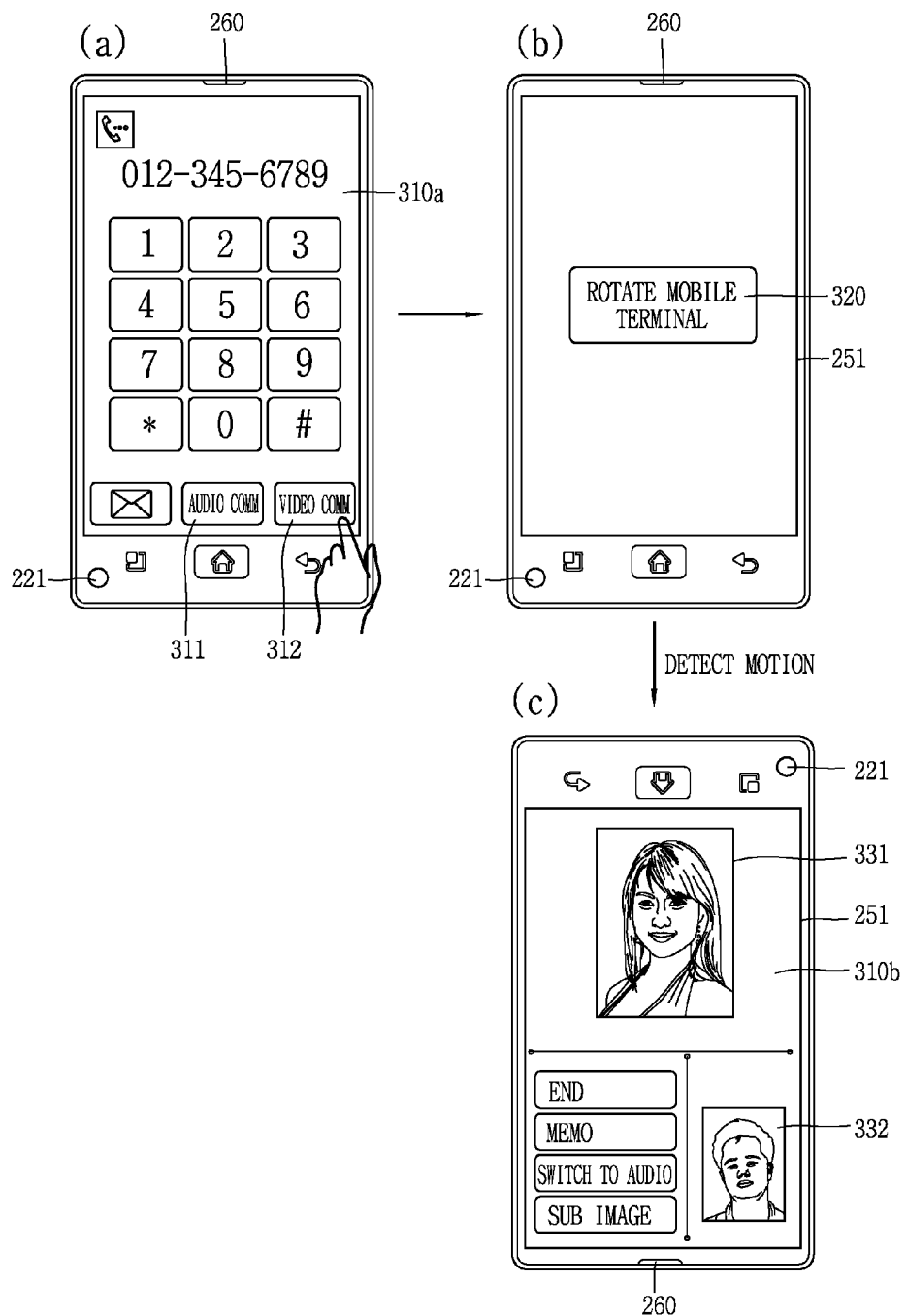
Figure 7:
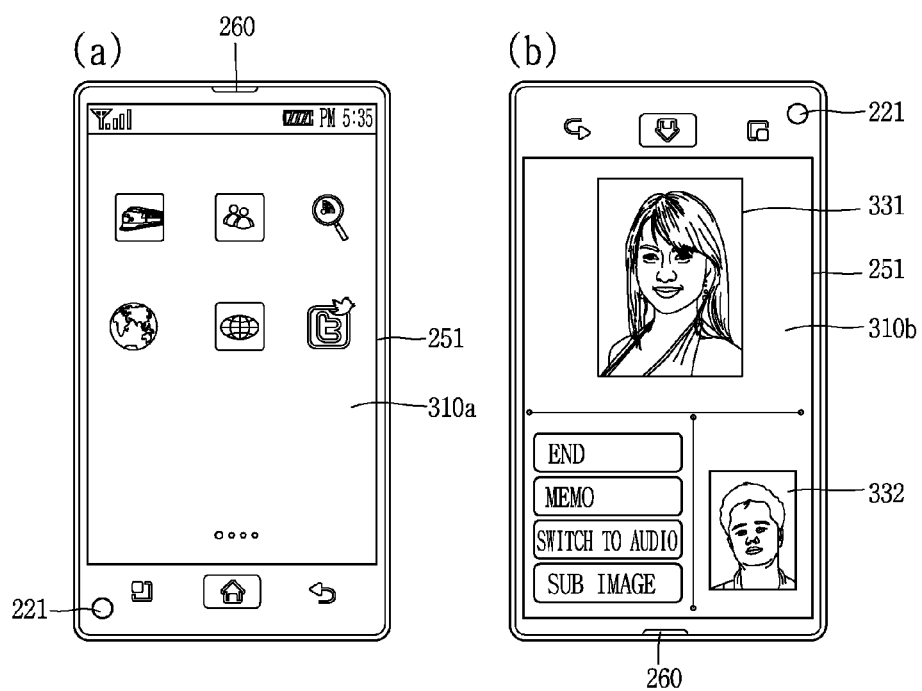
FIG. 7 is a conceptional view for describing the method of displaying the screen in a general mode and in a video communication mode in the mobile terminal according to one embodiment of the present invention.

FIG. 5 is a flow chart illustrating a method of switching the displaying direction of the screen during the video communication in the mobile terminal according to one embodiment of the present invention. FIGS. 6A and 6B are conceptional views for describing the method of switching the displaying direction of the screen as illustrated in FIG. 5, and FIG. 7 is a conceptional view for describing the method of displaying the screen in a general mode and in a video communication mode.

First, as illustrated in FIG. 5, the control unit 180 activates the camera 221 based on the occurrence of the video communication event (S510). The video communication refers to a video call in which the user and the other party have a conversation while viewing images by transmitting the images that are captured in real time by the cameras installed in their respective mobile terminals, to each other and at the same time receiving the images from each other. Accordingly, when the video communication event occurs, the controller 180 activates the camera 221 and thus transmits the image data obtained by the camera 221 to the other party's mobile terminal at the other end.

Next, when the video communication is set up in response to the video communication event, the controller 180 displays a video communication screen including image data obtained by the camera 221 on the display unit 25 (S520). The video communication screen is an image that is output to the display unit 151 during the video communication, and as illustrated in FIG. 6A, an image captured by the camera installed in the other party's mobile terminal at the other end or an image transmitted from the other party's mobile terminal is displayed in a first region 331 in the video communication screen described above. In addition, an image corresponding to image data obtained by the camera 221 installed in the user's mobile terminal 221 is displayed in a second region 332 in the video communication screen 310b described above. On the other hand, at this point, the first region 331 and the second region 332 may be variously changed in position and size.

Subsequently, the controller 180 switches the displaying direction of the video communication screen to change the viewing angle of the camera (S530). For example, when the sound output unit 260 is arranged in the upper end portion of the mobile terminal and the camera 221 is arranged in the lower end portion, as illustrated on the upper left side (a) of FIG. 6A, the controller 180 controls the display unit 251 during the video communication, in such a manner that the displaying direction of the video communication screen 310b is switched as illustrated on the lower right side (c) of FIG. 6A.

That is, the controller 180 obtains the image data corresponding to the user's face within the viewing field of the camera 221, with the camera 221 being positioned over the video communication screen 310b in the displaying direction of the video communication screen 310b.

In this instance, as illustrated on the lower right side (c) of the FIG. 6B, the video communication screen of which the displaying direction is switched is made to correspond to the direction in which the user views the image, by rotating the mobile terminal by 180 degrees. In this instance, the user can be aware that he needs to rotate the mobile terminal because the displaying direction is switched.

In addition, the controller 180 controls the display unit 251 in such a manner that a pop-up window 320 is displayed to indicate the request for the rotation of the main body, as illustrated on the upper right side (b) of FIG. 6A, before switching the displaying direction of the video communication screen. In this instance, the controller 180 can forcefully switch the video communication screen 310b as illustrated on the lower right side (c) of FIG. 6A, even though the mobile terminal is not rotated.

The controller 180 can also display a selection icon which the user chooses in the pop-up window 320 to determine whether to switch the video communication screen. Then the display unit 251 may be controlled in such a manner that the displaying direction of the video communication screen is switched only when the user selects the selection icon.

In addition, the controller 180 may control the display unit 251 in such a manner that the displaying direction of the video communication screen 310b is switched when the motion of the mobile terminal is detected, that is, only when the main body is rotated and thus the camera 221 is positioned over the video communication screen 310b, as illustrated on the lower right side (c) of FIG. 6B.

That is, when the sensing unit 140 configured to detect the motion of the main body in response to the video communication event is installed into the main body, the controller 180 can control the display unit 251 in such a manner that the displaying direction of the video communication screen is switched only when the motion of the mobile terminal meets a reference condition.

In addition, the meeting of the reference condition by the motion of the main body is defined as meaning that the mobile terminal is moved from a first position (refer to a broken line rectangle 200a in FIG. 9) corresponding to a predetermined imaginary reference axis (refer to a line 'A-A' in FIG. 9) to a second position (refer to a solid line rectangle 200b in FIG. 9) that is inclined by a predetermined angle to the right with respect to the predetermined imaginary reference axis. That is, the reference condition is set as the predetermined angle representing a predetermined extent to which the main body is rotated with respect to the reference condition.

The predetermined angle may be in a wide range including 90 degrees, and 180 degrees, and the controller 180 may switch the displaying direction of the video communication screen in such a manner that the main body corresponds to the angle by which the main body is rotated.

That is, referring to FIG. 7, in the mobile terminal according to an embodiment of the present invention, the sound output unit 260 is arranged over the screen 310b in the displaying direction of the screen 310b on a waiting mode screen, for example, on a home screen, as illustrated on the upper left side (a) of FIG. 7, and the camera 221 is arranged under the screen 310b. Then, on the screen 310b in a video communication mode that is displayed in response to the video communication event, the user's face may be photographed in its entirety with the camera 221 by switching the displaying direction of the video communication screen 310b in such a manner that the camera 221 is positioned over the video communication screen 310b in the displaying direction of the video communication screen 310b and the sound output unit 260 is positioned under the video communication screen 310b.

In addition, the mobile terminal, which is rotated by 180 degrees, is illustrated on the upper right side (b) of FIG. 7, and when the mobile terminal is rotated by 90 degrees, the camera 221 may be positioned to the left of or to the right of the video communication screen in the displaying direction of the video communication screen.

As described above, in the mobile terminal according to an embodiment of the present invention, the image data on the object may be obtained even when the camera is arranged in the lower end portion of the mobile terminal, by switching the displaying direction of the screen to change the viewing angle of the camera during the video communication.

A method of switching the displaying direction of the video communication screen based on whether the mobile terminal is moved and the extent to which the mobile terminal is moved is next described in detail below referring to the accompanying drawings.

Figure 8:
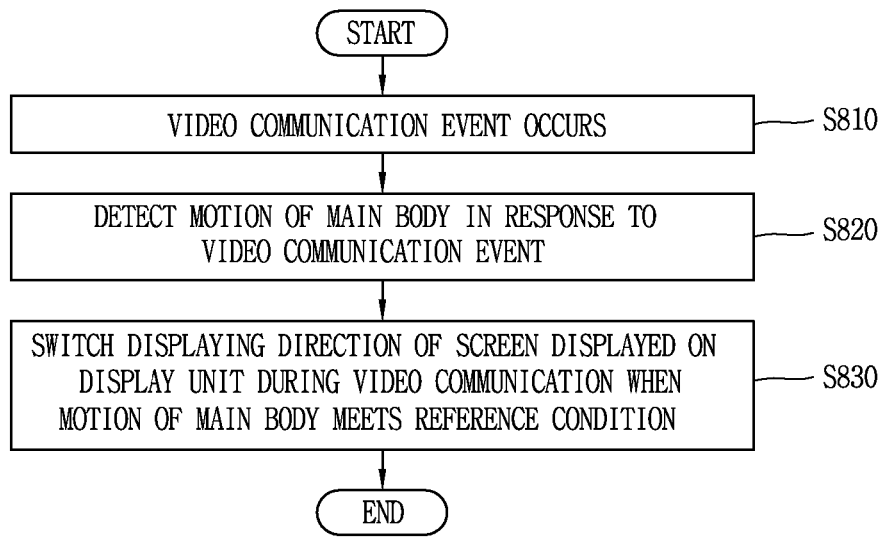
FIG. 8 is a flow chart illustrating the method of switching the displaying direction of the screen during the video communication in the mobile terminal according to one embodiment of the present invention.
Figure 9:
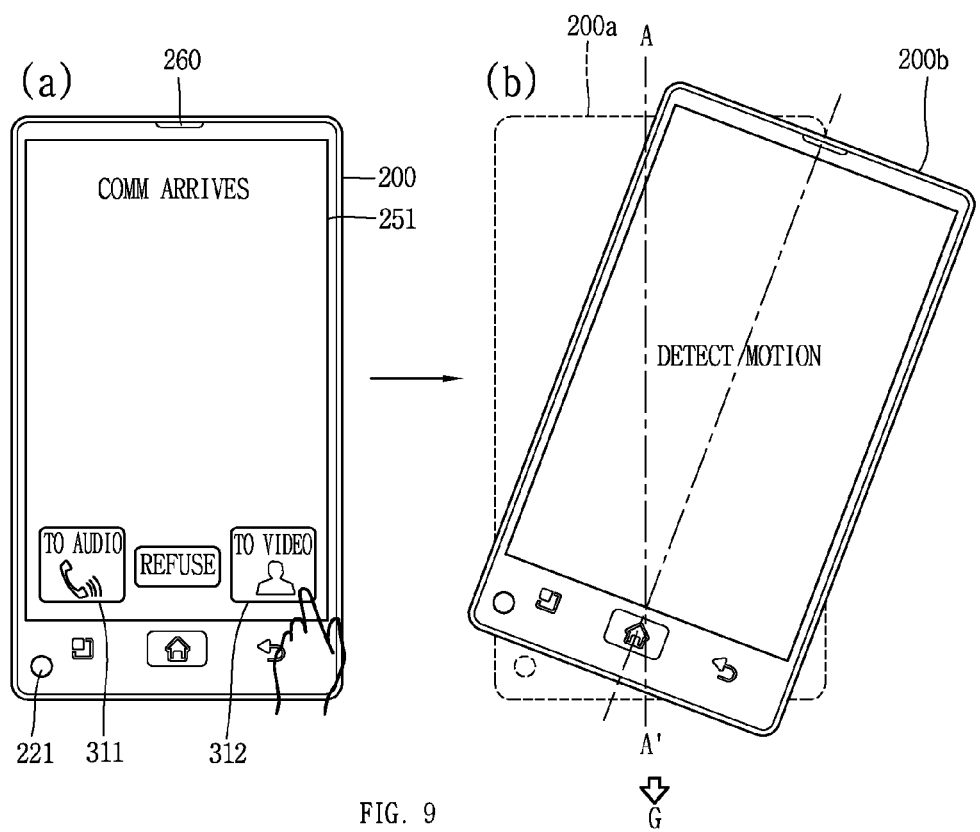
FIG. 9 is a conception view for describing the method of switching the displaying direction of the screen, as illustrated in FIG. 8, in the mobile terminal according to one embodiment of the present invention.
Figure 10B:
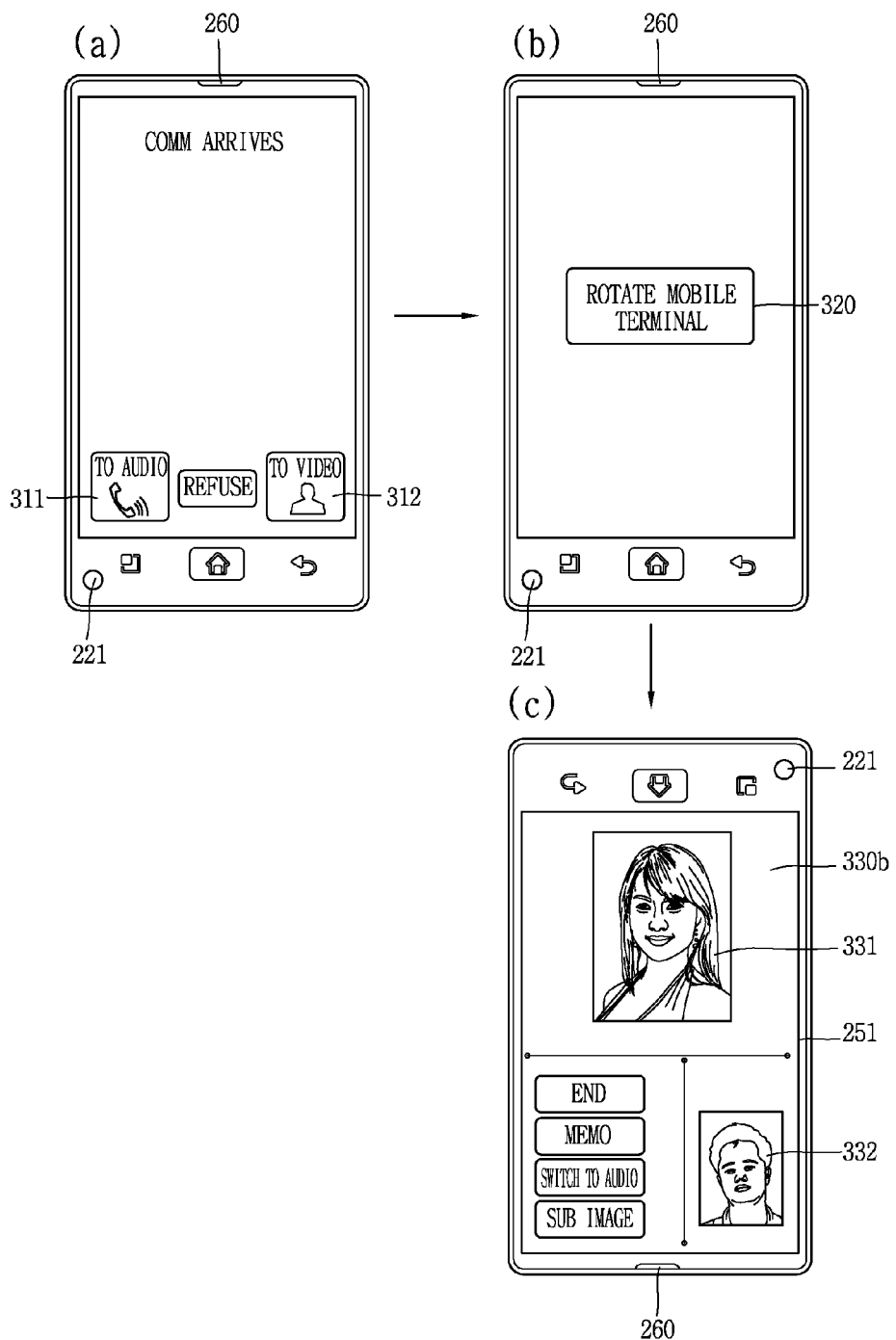

FIG. 8 is a flow chart illustrating a method of switching the displaying direction of the screen based on the motion of the main body during the video communication, FIG. 9 is a conceptional view for describing the method of switching the displaying direction of the screen, and FIGS. 10A and 10B are conceptional views for describing the displaying direction of the screen that depends on the motion of the main body in the mobile terminal according to one embodiment of the present invention.

First, referring to the flow chart illustrated in FIG. 8, the video communication event occurs in the mobile terminal (S810). The input by the user of the control commend to set up the video communication with the other party at the other end in response to the video communication receiving event is described below, as one example of the video communication event. As illustrated in FIG. 9, the control command is input through an icon 312 associated with the communication connection, which is displayed on the display unit 251 in response to the video communication receiving event.

When the video communication event occurs as described above, the controller 180 controls the sensing unit 140 in order to detect the motion of the main body of the mobile terminal in response to the video communication event (S820). The sensing unit 140 is installed in the mobile terminal 200, and recognizes the motion and the position of the mobile terminal 200. The sensing unit 140 includes at least one of a terrestrial magnetism sensor, a gyro sensor, and an acceleration sensor.

The terrestrial magnetism sensor is a sensor that detects the direction and size of terrestrial magnetism and generates an electrical signal using the detected direction and size of terrestrial magnetism. The gyro sensor is a sensor that detects the rotation speed of the main body and generates the electrical signal using the detected rotation speed. The acceleration sensor is a sensor that measures the direction of the gravitational acceleration, detects a change in acceleration in a given direction and generates the electrical signal using the detected change in acceleration.

Accordingly, the sensing unit 140 detects whether the main body is rotated. That is, the sensing unit 140 detects displacement according to the rotation of the main body, such as the rotational direction and the rotational angle and generates the electrical signal using the detected rotational direction and rotational angle. The detection by the sensing unit 140 of the rotation of the main body means that the main body 200 is inclined by certain degrees in a gravitational direction G with respect to the longitudinal direction A-A', as illustrated on the upper left side (b) of FIG. 9.

For example, when the sound output unit 260 of the main body 200a is positioned over the screen in the displaying direction of the screen, in the longitudinal direction A-A' of the main body 200a, an angle is a zero degree between the main body 200a and the gravitational direction G. Then when the sound output unit 260 is positioned under the screen in the displaying direction of the screen, that is, the camera 221 is positioned over the screen, as illustrated on the lower right side (c) of FIG. 10A and the main body 200a is positioned along the longitudinal direction A-A', the angle is 180 degrees between the main body 200a and the gravitational direction G.

In this manner, the sensing unit 140 detects the extent to which the main body is moved with respect to the imaginary reference axis A-A' (refer to FIG. 9), that is, the angle at which the mobile terminal is inclined with respect to the imaginary reference axis A-A'.

Next, when the motion of the mobile terminal meets the reference condition as a result of the detection by the sensing unit 140, the controller 180 controls the display unit 251 in such a manner that the displaying direction of the screen displayed on the display unit 251 is switched during the video communication (S830).

When the sensing unit 140 detects the motion (from the broken line rectangle 200a to the solid line rectangle 200b) of the main body as illustrated in FIG. 9, the controller 180 computes the angle between the main body 200b and the imaginary reference axis A-A'. Then, the controller 180 switches the displaying direction of the screen by an angle that corresponds to the angle at which the main body is inclined.

For example, when the rotational angle of the mobile terminal (from the broken line rectangle 200a to the solid line rectangle 200b) with respect to the reference axis A-A' is 90 degrees as illustrated on the upper left side (b) of FIG. 10A, the controller 180 rotates the displaying direction of the screen by 90 degrees from the displaying direction of the screen displayed as illustrated on the middle left side (a) of FIG. 10A and thus displays the image.

Then, when the rotational angle of the mobile terminal (from the broken line rectangle 200a to the solid line rectangle 200b) with respect to the reference axis A-A' is 180 degrees as illustrated in the lower right side (c) of FIG. 10A, the controller 180 rotates the displaying direction of the screen by 180 degrees from the displaying direction of the screen displayed as illustrated on the middle left side (a) of FIG. 10A and thus display the image. That is, the controller 180 controls the display unit 251 in such a manner that the extent to which the displaying direction of the screen is rotated varies depending on the extent to which the main body is inclined.

The image that is displayed on the display unit 251 illustrated on the middle left side (a) of FIG. 10A is when the main body of the mobile terminal is positioned in the direction of usually using the mobile terminal. That is, the middle left side (a) of FIG. 10A illustrates that the video communication is in progress in a state where the sound output unit 260 is positioned over the screen in the displaying direction of the screen and the camera 221 is positioned under the screen. The image transmitted from the other party at the other end is displayed on the first region 331 on the video communication screen, and the image data obtained by the camera 221 is displayed on the second region 332b. In this manner, since when the main body is positioned in the direction of usually using the mobile terminal, the viewing angle of the camera 221 is limited, the user's entire face is not included within the viewing field and thus the user's face of which one part is not photographed is displayed on the second region 332a and is transmitted to the other party at the other end.

On the other hand, when the mobile terminal is rotated (from the broken line rectangle 200a to the solid line rectangle 200b) as illustrated in FIGS. 10A to 10C, the position of the camera 221 is suitable for photographing the user's entire face and thus the user's face that is photographed in its entirety may be displayed on the second region 322b.

In this manner, in the mobile terminal according to an embodiment of the present invention, the user's face is made to be included within the viewing field of the camera by switching the video communication screen in response to the motion of the mobile terminal during the video communication.

In addition, the controller 180 switches the displaying direction of the screen only when the motion of the main body meets the predetermined reference condition. The reference condition may be variously set according to the user's needs or the setting in the controller 180. As one example, the displaying direction of the screen may be switched when the main body is moved from the first position that corresponds to the predetermined imaginary reference axis to the second position that is inclined at a predetermined angle with respect to the first position.

At this point, the first position is when an angle between the first position and the reference axis A-A' is a zero degree as illustrated on the middle left side (a) of FIG. 10A. That is, the first position is when the sound output unit 260 is positioned over the screen in the displaying direction of the screen, along the direction G in which the sound is output.

Then, the second position is when the mobile terminal is rotated by the predetermined angle with respect to the reference axis, as illustrated on the upper right side (b) of FIG. 10A or on the lower right side (c) of FIG. 10A. The predetermined angle may be variously set according to the user's needs or the setting in the controller 180, and may be in a wide range including 90 degrees and 180 degrees as illustrated on the upper right side (b) of FIG. 10A or on the lower right side (c) of FIG. 10A. By switching the displaying direction of the screen only when the motion of the main body meets the reference condition in this manner, the controller 180 may not switch the displaying direction when the user does not want to switch the displaying direction of the screen.

On the other hand, in the mobile terminal According to an embodiment of the present invention, the controller 180 (refer to FIG. 1) outputs alert information, which indicates a request for the motion of the main body, to the user, in response to the video communication event. That is, the controller 180 indicates the request that the user should rotate the mobile terminal in order to secure the viewing field of the camera.

The alert information may be output as sound information such as a sound or as a vibration. In addition, the alert information may be output to be displayed as the pop-up window 320 such as a text, as illustrated on the upper right side (b) of FIG. 10B.

In addition, the controller 180 controls the sensing unit 140 using the pop-up window 320 as described above, in such a manner that the motion of the mobile terminal is detected after the alert information is output. This is done to help the user be aware that he/she should rotate the main body before the motion of the main body is detected. On the other hand, when the main body is not rotated as illustrated on the lower right side (a) of FIG. 10B, as a result of detecting the motion of the main body after outputting or displaying the alert information, the controller 180 maintains the displaying direction of the screen without rotating the displaying direction of the screen.

Then, when the mobile terminal is rotated by the predetermined angle (for example, 180 degrees) as illustrated on the lower left side (c) of FIG. 10B, after outputting or displaying the alert information, the viewing angle of the camera 221 is changed to display the image, by rotating the screen by the angle that corresponds to the predetermined rotational angle.

In addition, as described above, when the video communication is terminated after the video communication is set up in response to the video communication event and the displaying direction is switched, the controller 180 may control the display unit 251 in such a manner that the displaying direction of the screen is switched back to its previous state. That is, when the video communication is terminated, the controller 180 may control the display unit 251 in such a manner that the current displaying direction of the screen is switched back to correspond to the direction of usually using the mobile terminal.

The method of controlling the mobile terminal when the motion of the mobile terminal is again detected after the motion of the mobile terminal is detected in response to the video communication event and the displaying direction of the screen is switched in response to the motion, as described above, is described below.

Figure 11A:
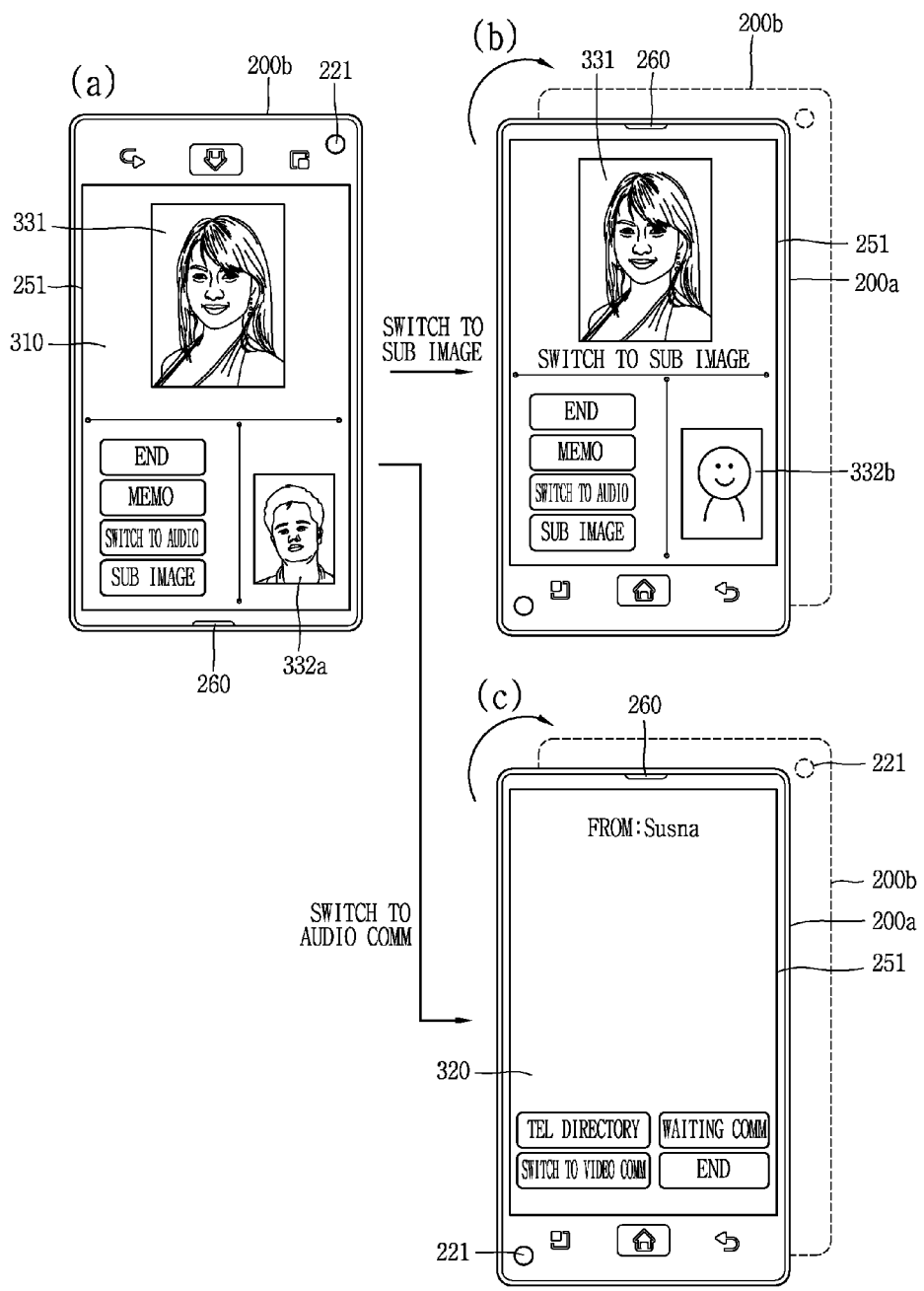

Next, FIGS. 11A, 11B, and 11C are conceptional views for describing a method of switching between a video communication mode or an audio communication mode based on the position of the main body in the mobile terminal according to one embodiment of the present invention.

For the sake of convenience in description, a state in which the mobile terminal is rotated by 180 degrees or 90 degrees, that is, the camera 221 is positioned over the screen in the displaying direction of the screen, as illustrated as one example on the upper left side (a) of FIG. 11A, is defined as meaning that the mobile terminal is positioned at a second position. In addition, a state in which the mobile terminal 200a is positioned along the direction of usually using the mobile terminal, that is, the sound output unit 260 is positioned over the screen in the displaying direction of the screen, as illustrated on the upper right side (b) of FIG. 11A, is defined as meaning that the mobile terminal is positioned at a first position.

On the other hand, when the mobile terminal 200b is rotated by 180 degrees during the video communication, that is, the mobile terminal is positioned at the second position, as described above, the displaying direction of the video communication screen is switched to correspond to the rotation of the mobile terminal 200b. In this manner, when the mobile terminal is moved from the second position 200b to the first position 200a, as illustrated on the upper right side (b) of FIG. 11A, in a state where the displaying direction of the screen is switched in response to the rotation of the mobile terminal, the controller 180 transmits a substitute image 332b to the other party's electronic device that is in connection for the video communication.

That is, instead of the image data that are input through the camera 221, the controller 180 may transmit any one of the images stored in the memory 160 (refer to FIG. 1) 1 to the other party at the other end, in response to the motion of the main body (from the solid line rectangle 200b to the broken line rectangle 200a).

In addition, the controller 180 may display a substitute image list 320 as illustrated on the upper right side (b) of FIG. 11B, in response to the motion described above, and may transmit an image item selected by the user from the substitute image list 320, for example, a 'flower' image, to the other party's electronic device as illustrated on the lower right side (c) of FIG. 11B.

In addition, instead of the substitute image, the controller 180 transmits the image data, which is input through the camera 221, to the other party's mobile terminal, when the main body is switched from the first position 200a back to the second position 200b as illustrated on the lower left and right sides (c) and (d) of FIG. 11B. In this manner, in the mobile terminal according to an embodiment of the present invention, the user transmits the substitute image when he/she does not want to the image data that is input through the camera, by changing the image to be transmitted to the other party's mobile terminal depending on the motion of the mobile terminal.

In addition, the mobile terminal according to the present invention switches the video communication to the audio communication when the mobile terminal is moved from the second position 200b to the first position 200a, as illustrated on the lower right side (c) of FIG. 11A and on the upper right side (b) of FIG. 11C in a state where the displaying direction of the screen is switched in response to the rotation of the main body. That is, the controller 180 switches a communication mode from the video communication, in which the image data input through the camera 221 is together transmitted to the other party at the other end, to the audio communication, in response to the motion of the main body (from the solid line rectangle 200b to the broken line rectangle 200a).

In addition, the controller 180 switches the audio communication back to the video communication when the main body is moved from the first position back to the second position as illustrated on the upper right side (b) and the lower right side (c) of FIG. 11C. In this manner, in the mobile terminal according to an embodiment of the present invention, the communication mode is switched by performing a simple operation based on the motion of the mobile terminal.

A method of selecting the communication mode using the motion of the mobile terminal when the video communication receiving event occurs is described below.

Figure 12A:
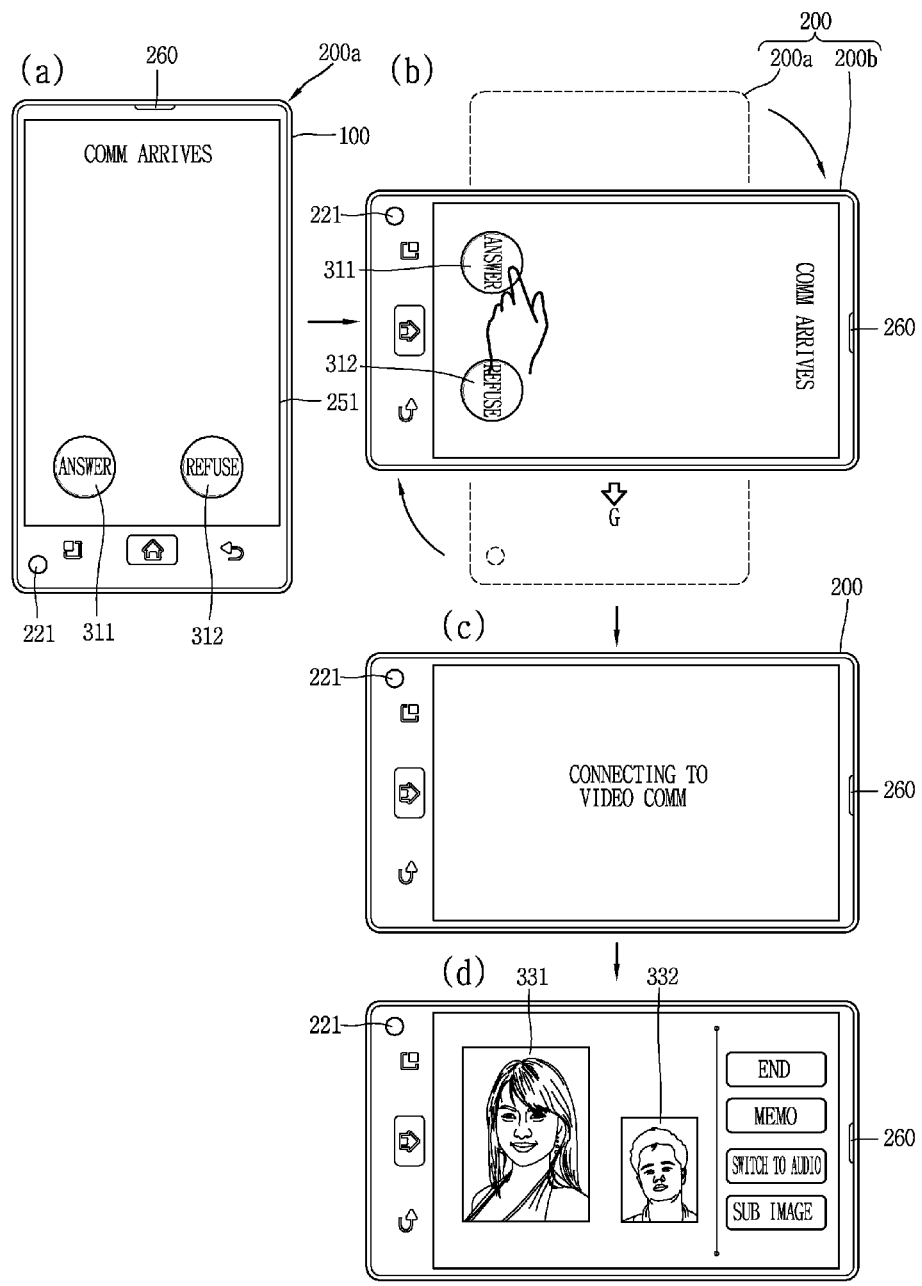
FIGS. 12A and 12B are conceptional views for describing the method of providing a communication mode depending on whether the main body of the mobile terminal is rotated in the mobile terminal according to one embodiment of the present invention.
Figure 12B:
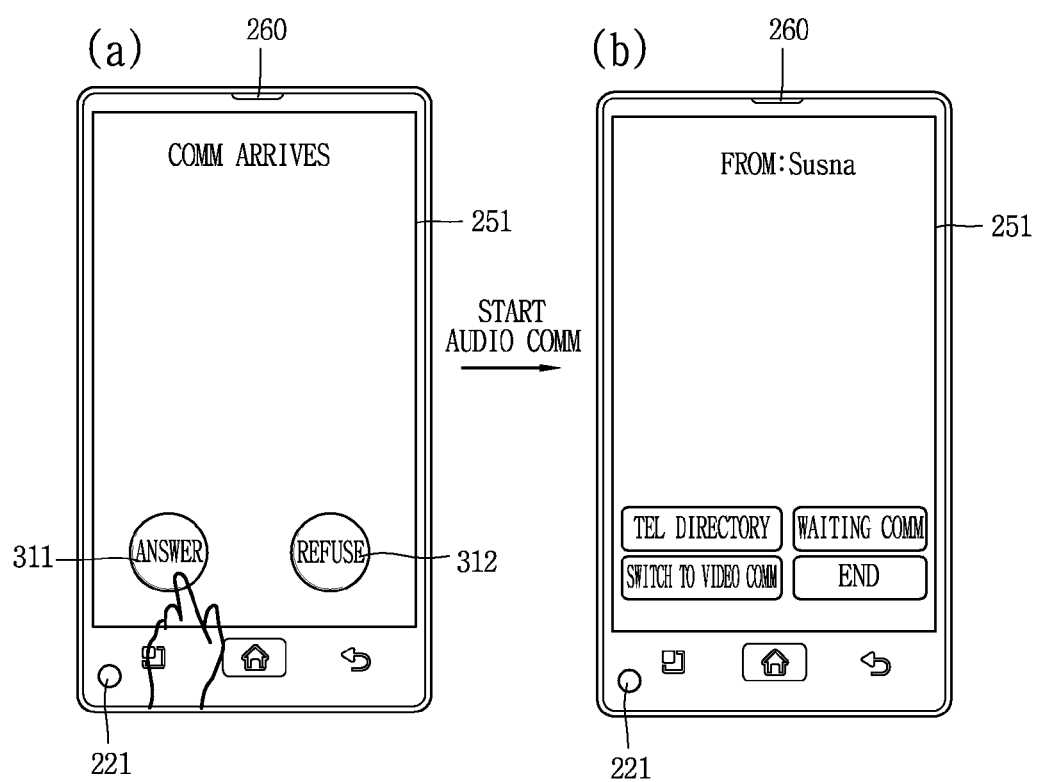

FIGS. 12A and 12B are conceptional views for describing the method of providing the communication mode depending on whether the main body is rotated, in the mobile terminal according to one embodiment of the present invention.

When a call event or the video communication event is received, as illustrated on the upper left side (a) of FIG. 12A, the controller 180 detects the motion of the main body 200a. Then, when the user inputs a communication connection control command 311 after moving the main body 200a by a distance that corresponds to the predetermined angle (from the broken line rectangle 200a to the solid line rectangle 200b), the controller 180 starts the video communication mode, based on the control command, as illustrated on the middle right side (c) and the lower right side (d) of FIG. 12A.

Then, when the main body is not moved by the distance that corresponds to the reference condition, that is, by the distance that corresponds to the predetermined angle, based on the occurrence of the event as illustrated on the upper right and left sides (a) and (b) of FIG. 12B, the controller 180 starts the audio communication mode, based on the communication connection control command 311.

In this manner, in the mobile terminal according to an embodiment of the present invention, the user may select the audio communication mode or the video communication mode in response to the occurrence of the call receiving event by performing the simple operation of moving the mobile terminal.

In addition, in the mobile terminal according to one embodiment of the present invention, the display unit with the large-sized screen may be realized by decreasing an area of a non-transparent region that corresponds to the one end portion in which the sound output unit is arranged and increasing an area of a transparent region in which the liquid crystal panel is arranged, in the window that is divided into the non-transparent region and the transparent region. That is, the area of the non-transparent region may be decreased by arranging the sound output unit and the camera in the opposite end portions, respectively, with the liquid crystal in between.

In addition, the mobile terminal according to one embodiment of the present invention and the method of controlling the mobile terminal may obtain the image data on the object by switching the displaying direction of the screen in such a manner as to change the viewing angle of the camera during the video communication, even though the camera is arranged in the lower end portion of the mobile terminal.

In addition, according to one embodiment disclosed in the present description, the method described above may be realized by being stored as processor-readable codes in a program-stored media. A ROM, a RAM, a CD-ROM, a magnetic tape, a floppy disk, an optical data storage device and the like are an example of the processor-readable media, and the processor-readable media may be realized in the form of a carrier wave (for example, transmission over the Internet).

In the mobile terminal described above, the configuration and method of the embodiments described above is not given any limitation on their applications, but all of, or some of the embodiments may be selectively combined with each other in a manner that creates various modifications.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a main body;
a display unit arranged on a front side of the main body, and configured to display a video communication screen in a first direction when a video communication event occurs;
a camera arranged in a lower end portion of the front side and configured to capture an image during the video communication event;
a sensing unit installed in the main body, and configured to detect a motion of the main body in response to the video communication event; and
a controller configured to:
switch a displaying direction of the video communication screen from the first direction to a second direction based on the detected motion of the main body, and
output alert information indicating a request for a rotation of the main body in response to the video communication event.

2. The mobile terminal according to claim 1, wherein the motion of the main body is defined as a rotation of the main body with respect to a predetermined imaginary reference axis, and
wherein the controller is further configured to calculate an angle between the main body and the reference axis when the sensing unit detects the motion of the main body.

3. The mobile terminal according to claim 2, wherein when the calculated angle is 90 degrees or 180 degrees, the controller is further configured to switch the displaying direction of the screen from the first direction to the second direction such that the captured image is rotated by 90 degrees or by 180 degrees with respect to the reference axis to correspond to the calculated angle.

4. The mobile terminal according to claim 2, wherein the controller is further configured to switch the displaying direction of the video communication screen from the first direction to the second direction when the detected motion of the main body meets a reference condition, and
wherein the motion of the main body meets the reference condition when the motion of the main body is from a first position corresponding to the predetermined imaginary reference axis to a second position inclined at a predetermined angle with respect to the first position.

5. The mobile terminal according to claim 4, wherein the controller is further configured to transmit a substitute image instead of the captured image to a counterpart terminal in the video communication event, when the main body is moved from the second position to the first position.

6. The mobile terminal according to claim 5, wherein the controller is further configured display a plurality of substitute images on the display unit when the main body is moved from the second position to the first position, and transmit a user-selected substitute image to the counterpart terminal.

7. The mobile terminal according to claim 5, wherein the controller is further configured to display the captured image instead of the substitute image when the main body is switched from the first position back to the second position.

8. The mobile terminal according to claim 4, wherein the controller is further configured to switch video communication in the video communication event to audio communication when the main body is moved from the second position to the first position.

9. The mobile terminal according to claim 1, wherein the alert information is output as at least one of a sound, a vibration, and a pop-up window.

10. The mobile terminal according to claim 1, wherein the controller is further configured to control the sensing unit to detect the motion of the main body after the alert information is output.

11. The mobile terminal according to claim 1, wherein the controller is further configured to switch the video communication screen back to the first direction, when the video communication event is terminated.

12. The mobile terminal according to claim 1, wherein the video communication event is one of a video communication receiving event and a video communication transmitting event, and wherein the controller is further configured to start a video communication mode based on an input communication connection control command when the motion of the main body is moved to meet a reference condition based on an occurrence of the video communication receiving event, and start an audio communication mode based on the communication connection control command when the motion of the main body does not meet the reference condition.

13. The mobile terminal according to claim 1, wherein the controller is further configured to display a pop-up window for selecting an audio communication mode or a video communication mode on the display unit in response to the occurrence of the video communication receiving event, and control the sensing unit to detect the motion of the main body based on the selection of the video communication mode by a user.

* * * * *